(12) United States Patent
Nigam et al.

(10) Patent No.: US 10,873,547 B2
(45) Date of Patent: Dec. 22, 2020

(54) METHODS AND SYSTEMS FOR PROVIDING MOBILE CONSENT VERIFICATION

(71) Applicant: Consent Depot, Camden, DE (US)

(72) Inventors: Hemanshu Nigam, Oak Park, CA (US); Jody Savin, Pasadena, CA (US)

(73) Assignee: SYNDESY LLC, Camden, DE (US)

( * ) Notice: Subject to any disclaimer, the term of this patent is extended or adjusted under 35 U.S.C. 154(b) by 0 days.

(21) Appl. No.: 16/593,650

(22) Filed: Oct. 4, 2019

(65) Prior Publication Data

US 2020/0213254 A1    Jul. 2, 2020

Related U.S. Application Data

(63) Continuation of application No. 16/377,202, filed on Apr. 6, 2019.

(60) Provisional application No. 62/786,738, filed on Dec. 31, 2018.

(51) Int. Cl.
| | |
|---|---|
| *H04L 12/58* | (2006.01) |
| *G06Q 50/26* | (2012.01) |
| *G09B 5/12* | (2006.01) |
| *H04M 1/725* | (2006.01) |

(52) U.S. Cl.
CPC ......... *H04L 51/046* (2013.01); *G06Q 50/265* (2013.01); *G09B 5/125* (2013.01); *H04L 51/12* (2013.01); *H04L 51/18* (2013.01); *H04M 1/72541* (2013.01)

(58) Field of Classification Search
CPC .... G06Q 50/01; G06Q 10/00; G06Q 30/0225; G06Q 50/18; G06Q 50/265; G06Q 10/06; G06Q 10/1095; G06Q 30/06; G06Q 40/08; G06Q 50/10; H04W 4/14; H04W 4/029; H04W 4/021; H04W 4/02; H04W 4/21; H04W 4/025; G06F 2221/2111; H04L 51/046; H04L 51/12; H04L 51/18; G09B 5/125; H04M 1/72541
See application file for complete search history.

(56) References Cited

U.S. PATENT DOCUMENTS

| | | | |
|---|---|---|---|
| 9,854,430 B1 * | 12/2017 | Sharif | H04W 12/0609 |
| 9,934,544 B1 * | 4/2018 | Whitfield | G06Q 50/265 |
| 2010/0002846 A1 * | 1/2010 | Ray | H04W 4/90 |
| | | | 379/37 |
| 2015/0269692 A1 * | 9/2015 | Ryan | G06Q 50/18 |
| | | | 705/311 |
| 2016/0267562 A1 * | 9/2016 | Follis | G06Q 30/0613 |
| 2017/0140174 A1 * | 5/2017 | Lacey | G06Q 20/4016 |
| 2017/0186307 A1 * | 6/2017 | Kim | G08B 25/008 |
| 2019/0342077 A1 * | 11/2019 | McMurdie | H04L 9/30 |

\* cited by examiner

*Primary Examiner* — Daniel Lai

(57) ABSTRACT

Various embodiments provide a method for initiating and storing consent verification between a user and another person planning to engage in an intimate activity. The method can include the steps of preparing a consent request by the user; sending the consent request to the person; time-stamping the sending of the consent request with the time and date; recording the GPS location of the sending of the consent request; receiving the consent request by the other person; and storing the interactions between users, the entries and edits thereto of any journal entries, and allowing for updates to the resources through the stored databases.

18 Claims, 13 Drawing Sheets

METHODS AND SYSTEMS FOR PROVIDING MOBILE CONSENT VERIFICATION

CROSS-RELATED APPLICATIONS

This application is a continuation of U.S. patent application Ser. No. 16/377,202, filed Apr. 6, 2019, entitled "Methods and Systems for Providing Mobile Consent Verification", which claims the benefits of and priority to U.S. Provisional Patent Application Ser. No. 62/786,738, filed Dec. 31, 2018, entitled "Methods and Systems for Providing Mobile Consent Verification", both of which are incorporated by reference.

BACKGROUND

The Politics of Sex have always been a challenge for people and for society, such as in entertainment, in business, in government, in sports, in music, in colleges and, of course, in high school. Today, the press is teeming with news accounts of allegations of sexual abuse, sexual harassment, and sexual misconduct as victims, newly empowered by the public toppling of institutions of victim suppression, come forward with their stories. This long overdue empowerment of victims, especially those previously threatened into silence, and the willingness of a public to embrace their devastating stories, comes with some pitfalls that cannot be ignored. When allegations alone can trigger the downfall and destruction of an accused almost instantaneously, it opens the door for false allegations by the vindictive, the charlatans, the fame-seekers, the lawyers, the mentally ill, the easily influenced, and even the delusional. All of this becomes even more complex when those tasked with getting to the truth must vet conflicts that have occurred in the present, or recent or even distant past.

In addition, there is a vast segment of society that still needs the tools and resources to be able to report with confidence and with evidence if and when they choose to make the difficult choice of coming forward. Finally, much confusion remains across society (particularly in the various segments mentioned above) as to where the lines are drawn from acceptable behavior all the way to criminal behavior. Accordingly, new methods and systems are needed for providing on-line verified consent before people enter into a sexual relationship, for keeping legally sound evidence of potentially unlawful conduct, and for increasing awareness and understanding for both the victim and perpetrator.

SUMMARY

Current approaches to addressing the issues of sexual harassment, sexual abuse, and other violations of consent, focus on punishment instead of prevention. In contrast, disclosed herein is a consent verification system, which is focused on solutions. Furthermore, the consent verification system provides resources to proactively educate users on the intricacies of consent and where the line is crossed into sexual harassment or abuse. Accordingly, the consent verification system is focused on communication and prevention of violations of sexual consent.

Various embodiments provide methods and systems for providing on-line verified consent before people enter into a sexual relationship. In some embodiments a consent verification system can include one or more data collection modules and a mobile consent application (a "consent app" or the "app"). The consent app, which is downloadable to a smart device, provides methods for parties to communicate on their smart devices and to accept (consent to) a sexual relationship between the parties. The consent app can communicate with a data collection module, which time-stamps each communication and tags the GPS location of the communication for encrypted archival and record keeping. The data collection module can use protocol to meet the evidentiary requirements to be used in a court of law, or other dispute resolution forums.

Various embodiments provide a consent verification system. The consent verification system can include a consent request module comprising a consent request repository, a journal module comprising a journal repository, and a reports module comprising a reports repository. The system can further include a resource database, a profile database, and blocked individuals database.

Various embodiments provide a method for initiating and storing consent verification between a user and a person to engage in an intimate activity. The method can include the steps of preparing a consent request by the user; sending the consent request to another person; time-stamping the sending of the consent request with the time and date; recording the GPS location of the sending of the consent request; and receiving the consent request by the other person.

The method can include the steps of: preparing a consent response by the other person; sending the consent response to the user; time-stamping the sending the consent response with the time and date; recording the GPS location of the sending of the consent response; and storing the consent response tagged with the time stamp and the recorded GPS location, both in the database for the user and the database for the other person.

In some embodiments, the method can include the steps of: accepting the consent request by the other person; agreeing to the consent request to engage in the intimate activity between the user and the other person; agreeing to the consent request in a way that informs an emergency contact of apparent agreement under duress without alerting the other person; time-stamping the agreeing to the consent request with the time and date; recording the GPS location of the agreeing to the consent request; and receiving the agreeing to the consent request by the user; storing the agreeing to the consent request tagged with the time stamp and the recorded GPS location, in both the database for the user and the database for the other person.

DRAWINGS

The present disclosure will become more fully understood from the description and the accompanying drawings, wherein.

Figure 1:
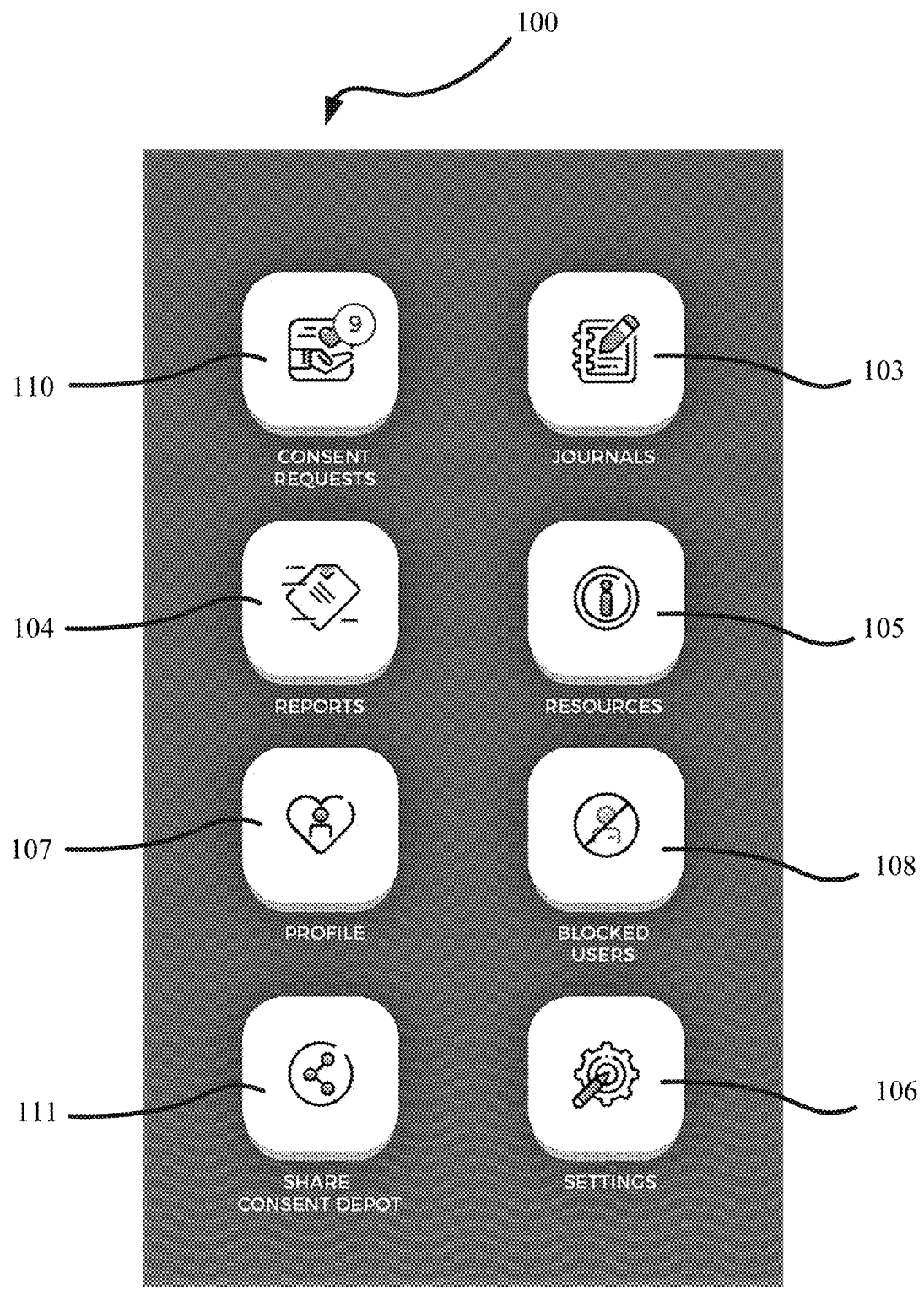
FIG. 1 is a diagram illustrating an exemplary menu on a smartphone for a consent verification system, according to various embodiments.

The drawings described herein are for illustrative purposes only of selected embodiments and are not intended to represent all possible implementations and are not intended to limit the scope of any of the exemplary embodiments disclosed herein or any equivalents thereof. It is understood that the drawings are not drawn to scale. For purposes of clarity, the same reference numbers will be used in the drawings to identify similar elements.

DESCRIPTION

The following description is merely exemplary in nature and is in no way intended to limit the exemplary embodiments, their applications, or uses. It is understood that the steps within a method may be executed in different order without altering the principles of the present disclosure. For example, various embodiments may be described herein in terms of various functional components and processing steps. It should be appreciated that such components and steps may be realized by any number of hardware components configured to perform the specified functions.

Various embodiments provide methods and systems for providing consent verification. Some embodiments include methods for providing a consent agreement between parties before entering into a sexual relationship. Various methods and systems, described herein, can employ a mobile application, which is in communication with a cloud-based system comprising one or more data repositories. For example, a consent verification system can comprise a consent repository, a journal repository, and a report repository. The consent verification system can include a downloadable application for mobile smart devices.

Some embodiments provide a consent repository, which allows two consenting adults, who are entering into a physically intimate relationship, to have a mutual agreement that confirms both of the consenting adults' approval prior to the sexual act. Such a consent is housed in an immutable storage, which tags each communication between the consenting adults with a time-date stamp and a GPS location.

In some embodiments, the consent verification system provides a journal module. The consent verification provides a victim of abuse or harassment the tools to leave a situation—such as the office of a supervisor—and immediately input, into the journal module, the information detailing what just occurred. An entry into the journal module captures the date-time and the location of an incident moments after the occurrence, which is stored in a journal repository. An employee, for example, has proof that she/he was actually at the office area of the supervisor when the incident occurred. The consent verification system can provide the victim (the "user") the ability to text or call within a consent verification app operating on the victim's smartphone. Such a call or text can be captured as a record and tagged with both a time-date stamp and a geolocation. The journal repository can be configured to prompt answers to information critical to any later evaluation when or if disclosure is ever made by a victim. Such a record can provide evidentiary value in any eventual legal or other formal proceeding.

In some embodiments, the consent verification system provides anonymized data reporting. The consent verification can capture data, which can be anonymized to deliver statistical reports on consent, harassment, and/or abuse without disclosing personal identifying information. These types of reports can be useful for garnering media/public attention, aiding law enforcement, raising societal awareness, and impacting conduct. The data collected could also be used to provide preventative and/or evidentiary value based on an analysis of the back-end repository, which can determine if a particular location or person is being identified by multiple victims. This analysis can generate useful information in any potential investigation and could be a catalyst for a victim to choose to come forward or for a false accuser to refrain from making specious and damaging claims. Thus, the greater the usage, the more powerful the consent app can be in stopping harassment and abuse.

In some embodiments, the consent verification system provides a resource center for all users. The consent verification system can provide resources for victims to get help, for example, connecting a victim with Times Up or RAINN. In addition, the consent verification system can be configured to provide resources for consenting users, such as, for example, what constitutes consent and how to understand issues that hierarchical power structures can create in potential relationships as well as, the impact they can have on the weaker party. As such, education and awareness focused on the potential abuser can lead to a decrease in abusive behavior.

In some embodiments, the consent verification system verifies an express agreement of consent between two parties contemplating or imminently embarking upon a sexual relationship. The consent verification system can verify acceptance (consent) to enter into the sexual relationship with a press of a key or by entering an acceptance password in the consent app operating on any smartphone. Users can establish an acceptance password (also referred to herein as an "acceptance code") that they pledge to keep secret when they download and sign up for the consent app. The acceptance password is a unique ID that only the user knows. The password is entered by the user to accept a request to enter into a relationship with the requester. In some configurations, any disclosure of the acceptance password by the user can be a violation of the terms of service of the consent app and can nullify any statement of verified, mutual consent.

In certain situations, one consenting party may want to withdraw consent, which can be withdrawn via the consent app and such withdrawal is recorded in both parties' consent repository. Once the parties consent, the consent verification system matches their mutual consent into a coordinated window. A time-date stamp and GPS location are tagged to the original expressed consent. In some configurations, a modified request can be sent back to the requester, who can accept the modification. Either party can send a withdrawal of consent. If a withdrawal is after the point of mutual consent, the withdrawal can be done in the coordinated window, with time-date stamps and GPS locations tagged to each of the communications between the parties. This again encourages healthy dialogue between the parties but also tracks the timeline of ongoing consent between the parties.

Establishing consent protects both parties who are entering into a sexual act. Theoretically, no one should be having sex without the consent of both parties. But miscommunications abound especially when a person is uncomfortable with the act of sex or with dialogue about sex. And many such a person exists. The consent verification system can take the complexity out of sexual relations. It reduces unknowns, such as what if one party consents, but later revises his or her memory of the encounter.

What if one party does not want to have sex? Having to stop and think and commit via consent verification can defuse the pressure to engage in an activity the reluctant party is not sure about. The consent app can be a deterrent to impulsive and irresponsible sex simply because the consent app compels the parties to slow down and think.

Clearly sexual predators do not obtain consent before they attack. And the greater the public subscription to the consent verification system, the more marginalized and vulnerable the predator. Furthermore, users can have an emergency code that sends a message to either a trusted contact or multiple trusted contacts or to authorities immediately, without alerting a potential predator who might be forcing a victim (the user) to consent.

This might all sound unromantic. But consensual intimacy between people who are openly communicating, expressing desires along with reservations, and acting out of unfettered free will can engender the most satisfying and romantic of sexual relationships, as well as the most legally sound.

The consent verification system provides iron-clad and well-tested security practices, which maintain encryption at every level. Each user has a unique, private and secure acceptance code. All data and personal information are protected by military grade encryption technology. In the event of a breach of privacy, or a hacking, any information that might be illegitimately accessed or misappropriated, manifests as useless gibberish because of the encrypted nature of the content. This is true at every level of cyber transmission and communication. Thus, private data remains protected until such time, if any, arises that the user elects otherwise, or disclosure is required by law and with appropriate legal process.

Various embodiments provide methods and systems for providing on-line verified consent before parties enter into a sexual relationship. Some embodiments provide a mobile consent application (also referred to herein as the "consent app" or the "app"), which is downloadable to a smart device and provides methods for parties to communicate on their smart devices to enter into a sexual relationship that agreed upon (consented to) by both of the parties. The consent app can communicate with a data collection module, which time-date stamps each communication and tags the GPS location of communication for encrypted archival and record keeping. The data collection module can use protocol to meet the evidentiary requirements to be used in a court of law, or other dispute resolution forums.

For example, the consent app can establish written sexual consent between parties both legally and in advance. The consent app can be linked to a consent repository, which is configured to store the communication between the parties with time and date stamps as well as GPS location tags. The data in the consent repository is encrypted and cannot be altered, edited, or deleted by either party. Either party can access their archives and review of one or more of their communications with another party. Such a party can add notes to the communications which are time-date stamped in real time and are tagged with the GPS location. These notes become part of the archival record and any alterations, edits, or deletions are recorded in a cumulative historical record of all notes activity.

In some embodiments, the consent app can communicate with a blood alcohol device to provide a record of a degree of intoxication of the parties entering into a consent agreement, which is time-date stamped and tagged with a GPS location and stored in both parties' consent repository. The consent app can also provide the means to send a message to an emergency contact to be automatically generated by the other party without the consent requester's knowledge when the other party feels forced into consenting.

The consent app compels responsible dialogue between the parties about a very consequential decision in a format that is familiar and digestible. The consent app can be configured to demystify and ameliorate some of the endemic discomfort associated with dialogue about sex. In some embodiments, the consent app provides tools to prevent miscommunications before such miscommunication results in devastating results. Accordingly, the consent app can promote healthier sexual or non-sexual relationships between the parties.

In some embodiments, the consent verification system can include a consent request module comprising a consent request repository, a journal module comprising a journal repository, and a reports module comprising a reports repository. The consent verification system can further include a resource database, a profile database, and blocked individuals database.

In some embodiments, the consent app can provide a journal module configured to record and decipher sexual harassment experienced by a user. As such, the consent app can remove the imbalance of power by giving power back to the powerless. In addition, the consent app can provide resources for help. The journal module can be linked to a journal repository, which is configured to store the record of each harassment event experienced by the user. The data in the journal repository is encrypted and cannot be altered, edited, or deleted by the user, however, the record can be added to in order to record additional or revised impressions of an event or to record another harassment event by the same person or another person in the same arena or other arena. The data in the journal repository can be sorted by harasser (person), by location (place), and/or by time. The chain of custody and record keeping of the journal repository meet or exceed the standards of criminal procedure or civil procedure for use of the record as evidence. The journal repository can store the GPS location of each alleged harassment, if the recording is made while still at that location, to provide further evidence of the truth of the matter asserted.

In addition, the journal module can provide the user the ability to call or text another person (an emergency contact) during a harassment, and that call, or text not only can send a cry for help but furthermore becomes part of the record stored in the harassment repository.

In some embodiments, the consent app can provide a journal module configured to record an abuse (sexual and/or physical and/or power) perpetrated by one person or a group of persons on a user. The journal module prompts a verifiable record of the abuse that remains confidential until such time, if ever, as a victim (the user) elects to take action. The journal module can be linked to a journal repository for storage of the record of the abuse, which cannot be altered, edited, or deleted by the victim. The journal module provides a record of "first impression" of the abuse, which can be valuable evidence for prosecutors to use in criminal procedures or in dispute resolution forums.

The journal module can be configured to call a friend for help and/or to call authorities to prevent or stop the abuse. The journal module can be configured with a first code to call the friend and a second code to alert the authorities, for example using 911.

In some examples, the journal module can be linked to the microphone of the user's smart device and can record the person's abuse of the victim, which is stored as an audio record in the journal repository. In some examples, the journal module can be linked to the camera of the user's smart device and can use video to record a person's abuse of the victim (user) and/or the scene after the abuse and/or the evidence on the victim's body, which is time-date stamped then tagged with the geolocation and stored as a video record in the journal repository. First impression notes can be added to either the audio record or the video record.

The consent verification system can include a reports module, which can be configured to collect data anonymously or with identifiable information. In a corporate environment, the data can be analyzed after a complaint to determine if a behavioral pattern exists for the person against whom the complaint is made. This analysis can help a company determine its risk exposure created by an employee or determine if proactive measures, such as, training, reorganizing, or intervention, are needed.

The consent app is user-friendly and universally available for smartphones through the ITUNES® Store or GOOGLE PLAY® sources. The consent app can be employed by individuals, as well as by corporations, academic institutions, health care facilities, and governmental agencies.

Starting with FIG. 1, a diagram illustrating a home screen 100 for a consent verification system on a smartphone, according to various embodiments. The home screen 100 can be on a smartphone, which can be any such device now known or developed in the future. The smartphone has an exemplary consent app installed and operating. The home screen 100 can comprise a plurality of buttons configured to move a user to another portion of the consent system upon activation.

In this example, the home screen 100 comprises a consent requests button 110, a journals button 103, a reports button 104, a resources button 105, a profile button 107, a blocked users button 108, a share consent depot button 111, and a settings button 106. Any of these buttons on the home screen 100 can be activated by the user to move the user to access a feature or to enter into a module of the consent verification system.

The journals button 103 is operable to move the user to a page for entry into a journal module. In some embodiments, the journal button 103 can be configured to move the user to a page to make a journal entry, which is tagged with a time-date stamp and GPS location then stored in a journal repository. For example, activation of the journal button 103 allows the user to create a new journal (as described herein), which can be updated to add further notes to a journal entry. Further, the journals button 103 can be configured to allow a user to view and edit a journal entry. In some embodiments, the journal can include "things to consider" to assist the user while entering information to a new journal entry.

The report button 104 can be configured to move the user to a page to generate reports from data in the consent repository or in the journal repository. In some embodiments, activation of the reports button 104 allows the user to view, to edit, and/or to print a report.

The resources button 105 can be configured to move the user to a page to access resources, such as those discussed herein. For example, activation of the resources button 104 allows the user to access allows the user to access various resources, such as, but is not limited to, websites, articles, hotlines, FAQs, definitions, hotlines, selected legal information, government agencies, contact information for support groups, and the like. In some embodiments, the resources can be updated during app software updates or by a Web Server.

The settings button 106 can be configured to move the user to a page to access the settings for the consent app. For example, activation of the settings button 106 allows the user to enter and/or adjust various settings in the system, such as, for example, phone settings, screen settings, notification format, alerts, and do-not-disturb hours. In some configurations, to log out of the consent app, the user activates the settings button 106 to access a log out button or to enter a log out code.

The profile button 107 can be configured to move the user to a page to create or edit the user's profile. For example, activation of the profile button 107 allows the user to enter or modify personal data, such as, but is not limited to, a profile image, first and last name, date of birth, gender, an email address, city, state, zip, pin and emergency code.

The blocked users button 108 can be configured to allow the user to block one or more undesired people from making requests to the user's consent app. For example, activation of the blocked users button 108 allows the user to add a person to the blocked user list or remove a person from the blocked user list.

The consent requests button 110 can be configured to move the user to a page to access a text conversation for an agreement to have an intimate sexual relationship, which is archived in the consent repository, as discussed herein. In this example, the consent request button 110 has a number 9 in a circle on the upper right corner of the button, which is a notification that someone has either started a new conversation, or someone has replied to an ongoing conversation.

The share consent app button 111 can be configured to allow the user to send the app to another person, who can then register and participate in a consent conversation. Of course, the menu 101 can comprise other buttons, such as, for example, an emergency button configured to call for help if the user has become or is about to become a victim of abuse.

Figure 2:
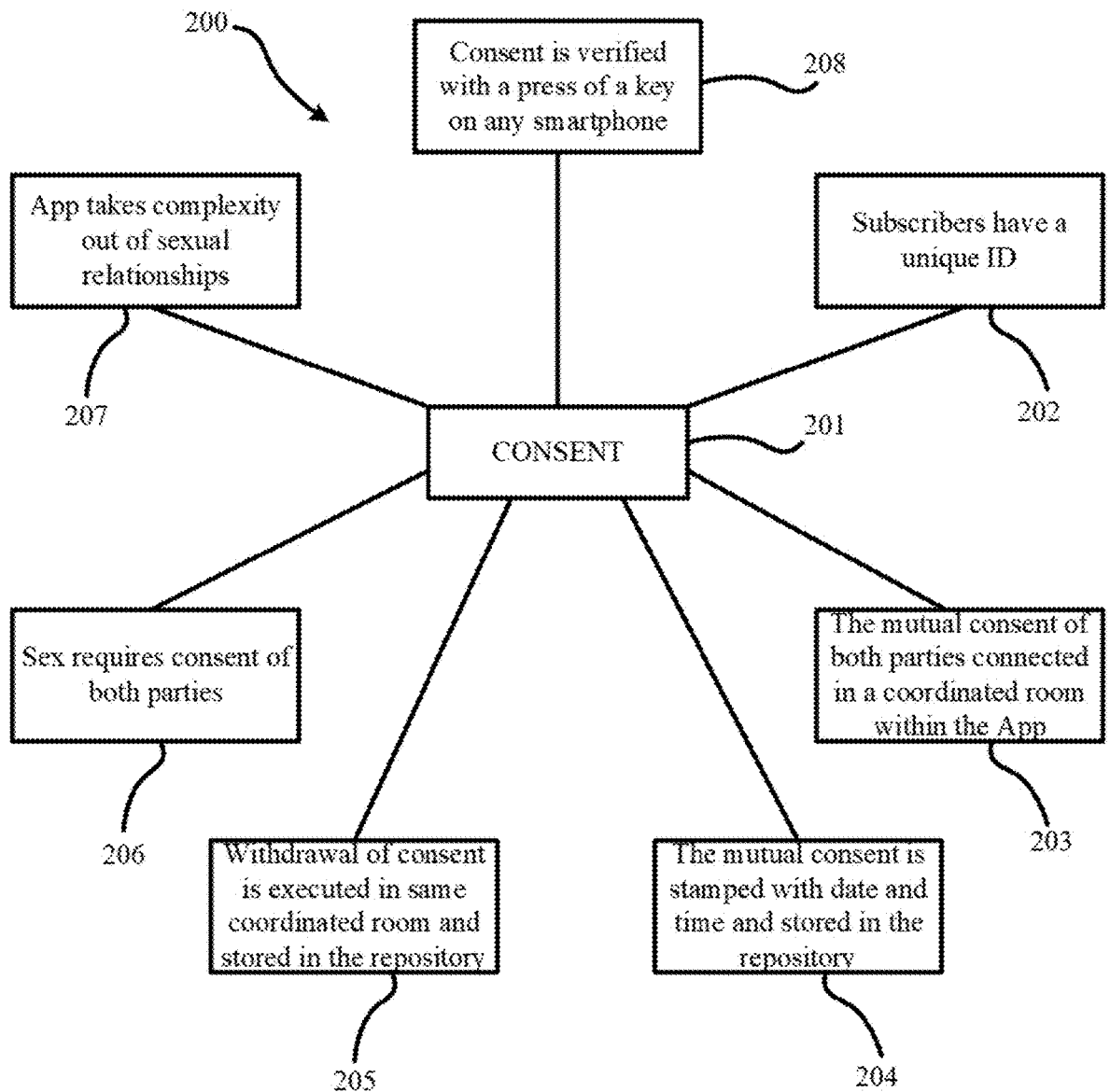
FIG. 2 is a relational diagram illustrating a method of consent, according to various embodiments.

In FIG. 2, a relational diagram illustrating a method of consent, according to various embodiments. A method 200 of consent comprises various components or steps to reach consent 201. For example, the method 200 comprises that the parties (also referred to as "users" or "subscribers") need to have established a unique password 202 (also referred to as "User ID"). After the parties have enter the system by launching the consent verification app and entering their unique password, the parties can have the discussion regarding consent in a "room" within the app 203. If consent is reached, formalized consent is entered with a date and time stamp 204 and stored in a consent repository. If one of the parties changes their mind, withdrawal of consent is executed in the same room 205 and is entered with a date and time stamp, and then stored in the consent repository. The consent of both parties 206 is required to engage in sex. The discussion in the room takes complexity out of sexual relations 207. Consent 201 is verified with a press of button or an entry of a code in the consent verification app operating on the smartphone 208. All activities are recorded and tagged with a time-date stamp and a geolocation, for example GPS coordinates, then stored in the consent repository.

Figure 3:
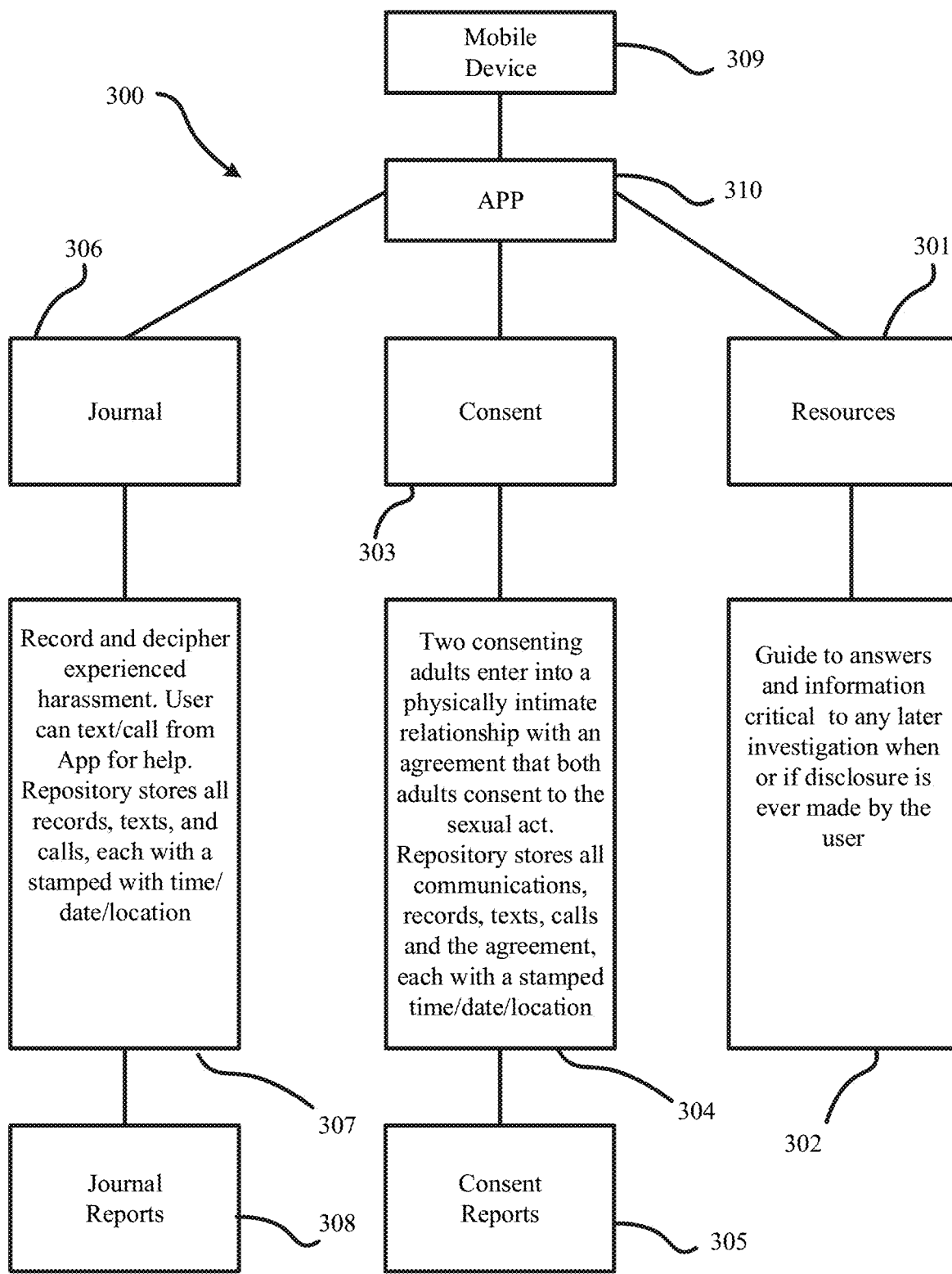
FIG. 3 is a block diagram illustrating different repositories in a consent verification system, according to various embodiments.

Moving to FIG. 3, a block diagram illustrates an example of three different repositories in a consent verification system 300. In some embodiments, the consent verification system 300 comprises a consent app 310 operating on a mobile device 309. The consent app 310 is the user facing or front end of the system and is configured to provide a user access via the mobile device 309 to a resources module 301, a consent module 303 and a journal module 306.

The resources module 301 can provide a resource repository 302, which can be used as guide to answers and information For example, the resource repository 302 can include, but is not limited to, websites, articles, hotlines, FAQs, definitions, hotlines, selected legal information, government agencies, contact information for support groups, and the like. In some embodiments, the resources repository 302 can be updated by a system administer.

The resources module 301 can provide a guide to a victim, which can be critical to any later investigation when or if disclosure is ever made by a victim. In addition, the resources module 301 can provide answers to what is harassment and what behavior constitutes harassment or abuse, so that a victim can better assess her/his situation.

The consent module 303 can provide a method for two consenting adults to enter into a physically intimate relationship with a mutual agreement that confirms both individuals approve of the sexual act. For example, the consent module 303 can establish written sexual consent between parties both legally and in advance and is configured to store the communications between the parties with time and date stamps and to tag each communication with a GPS location, which is stored in the consent repository 304.

The data in the consent repository 304 is encrypted and cannot be altered, edited, or deleted by either party. Either party can access their archives and review of one or more of their communications with another party. Such a party can add notes to the communications, which are date- and time-stamped in real time and are tagged with a GPS location and are stored in the consent repository 304. The notes become part of the archival record and cannot be altered, edited, or deleted in the future.

Consent reports 305 is configured to create a report from the data stored in the consent repository 304. For example, a consent report 305 can be generated from data stored in the consent repository 304, which can be limited to a date range, a geolocation or only one individual. Once the consent report 305 is generated, the user can review the report, download the report, and/or print the consent report 305. The consent report 305 is configured to allow an addition of notes to a generated consent report 305, which is time-date stamped and tagged with a GPS location, then stored with the generated consent report 305.

For example, the journal module 306 can be configured to allow a user to make an entry as a record of an attacker's abuse (sexual and/or physical) on a victim (the user). The journal module 306 prompts an entry that is a verifiable record of the abuse that remains confidential until such time as the victim elects to take action. Entries of abuse in the journal repository 307 cannot be altered, edited, or deleted by the victim. The journal repository 307 can provide a record of "first impression" of the abuse, which can be valuable evidence for prosecutors to use in criminal procedures or for dispute resolution forums.

In addition, the journal module 306 can provide a victim (the user) a safe space to record and decipher harassment experienced by the victim. The journal module 306 allow the victim to capture the date/time/location of an incident moments after occurrence and enter notes about the harassment, all of which are stored in the journal repository 307. The victim (the user) can text/call from the consent app 310, the act of which can also be captured as a record in the journal repository 307.

In some examples, the journal module 306 can access the microphone of the smartphone for the recording of an abuse event or a harassment event. The journal module 306 can access the camera of the smartphone for making a video of the harassment event. First impression notes can be added to either the audio record or the video record, all of which are tagged with a time-date stamp and geolocation then stored in the journal repository 307.

Journal reports 308 is configured to create a report from the data stored in the journal repository 307. For example, a journal report 308 can be generated from data stored in the journal repository 307, which can be limited to a date range, a geolocation or only one individual. Once the journal report 308 is generated, the user can review the report, download the report, and/or print the journal report 308. The journal report 308 is configured to allow an addition of notes to a generated journal report 308, which is time-date stamped and tagged with a GPS location, then stored with the generated journal report 308.

Figure 4:
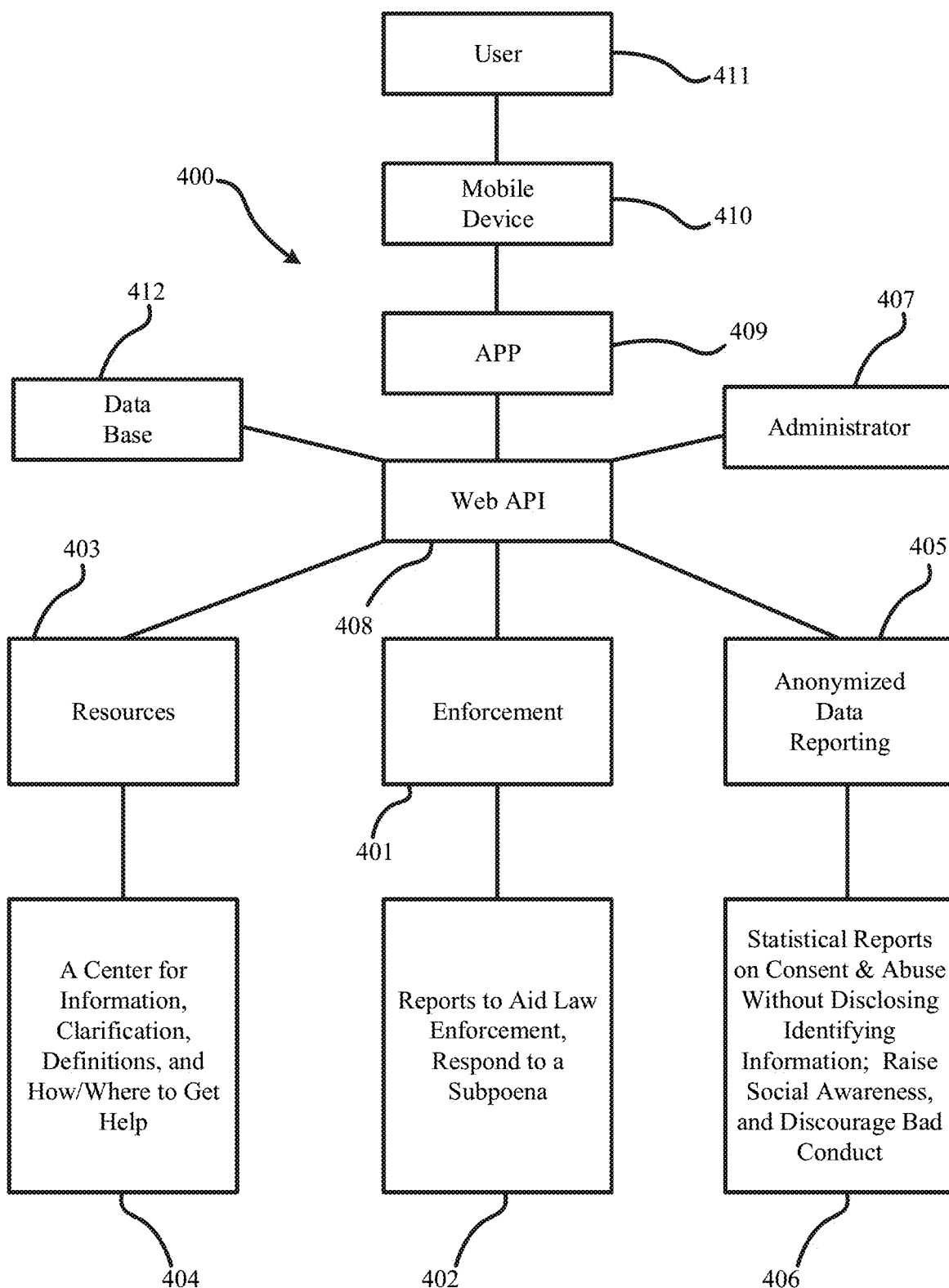
FIG. 4 is a block diagram illustrating an exemplary outline of access to data, according to various embodiments.

FIG. 4 is a block diagram illustrating an exemplary outline of access to data. In some embodiments, a database 400 can include an anonymized data reporting module 401. For example, the anonymized data reporting module 401 can provide reports 402 designed to aid law enforcement, to raise societal awareness, and/or to discourage bad conduct. In some embodiments, a database 400 can include a resource module 403. For example, the resource module 403 can be designed to be a center 404 for information, clarification, definitions, and where to get help. In some embodiments, a database 400 can include an enforcement module 405. For example, the enforcement module 405 can be designed to provide statistical reports on consent, harassment, and/or abuse without disclosing identifying information.

Figure 5:
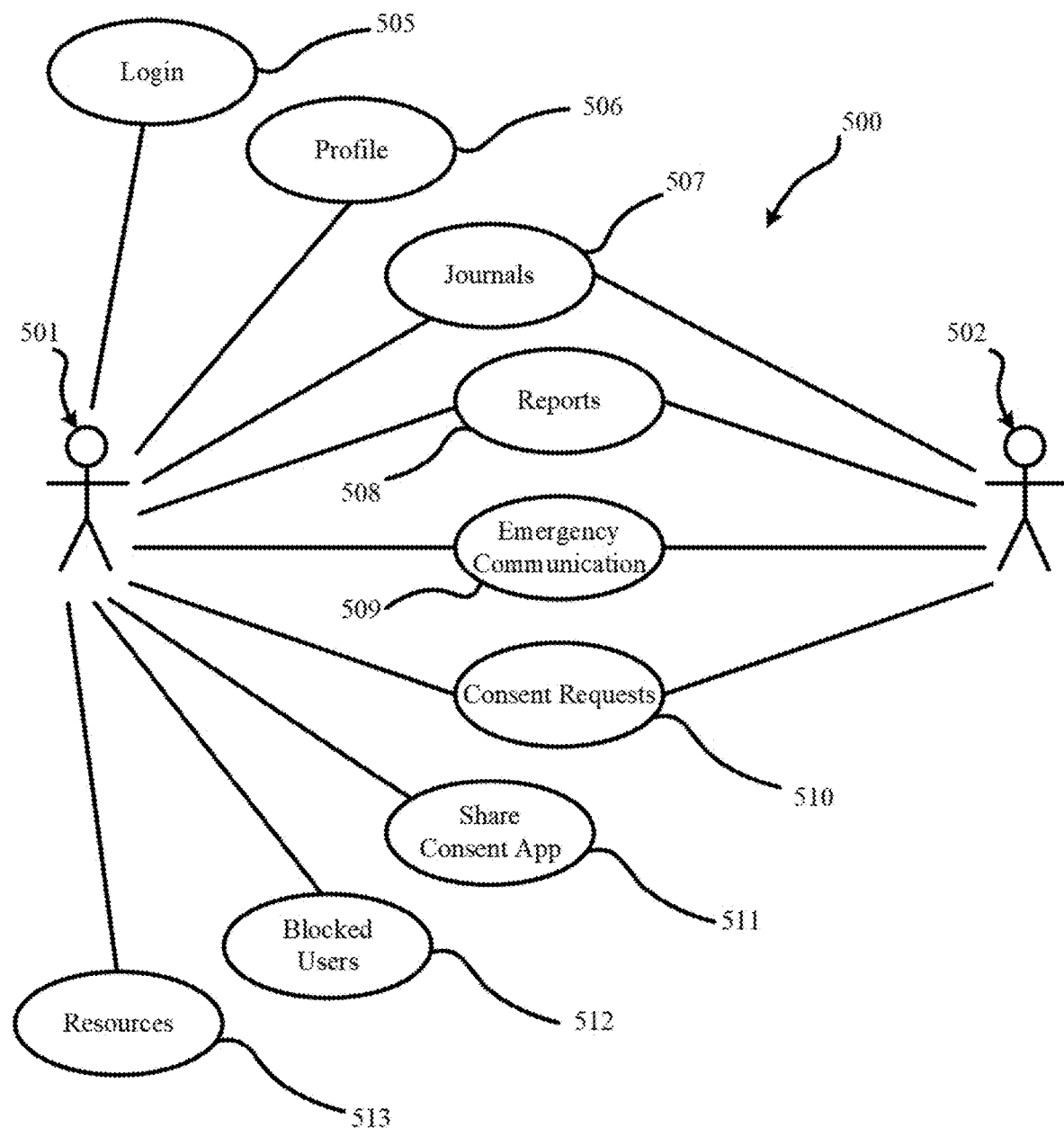
FIG. 5 is a relational diagram illustrating an exemplary-use case-view of the software architecture, according to various embodiments.

FIG. 5 is a relational diagram illustrating an exemplary use case 500 of the software architecture of the consent verification system. A user 501 can initiate a particular use case by interfacing with the consent app via a smartphone, as described herein. All the use cases described in FIG. 5 are initiated by the user 501. The use cases interact with an external Web Server and the results of a particular use case are stored in an appropriate repository.

A location manager 502 can be initiated automatically by the consent app for a particular use case. Not all use cases initiate the location manager 502 (as discussed below). When the location manager 502 is initiated, the GPS location of the smartphone is recorded for the particular use case that has been initiated by the user 501. The location manager 502 can connect the recorded GPS location to the particular use case and the results of the particular use case along with the recorded GPS location are stored in an appropriate repository. In some aspects, when the location manager 502 is initiated, the time-date (of the smartphone in addition to the GPS location) are recorded for the particular use case that has been initiated by the user 501. The location manager 502 can connect the time-date and the GPS location to the particular use case and the results of the particular use case along with the recorded time-date stamp and GPS location are stored in the appropriate repository.

A login 505 use case allows the user 501 to login, which is registered through a website. A profile 506 use case allows the user 501 to update personal information, such as, but is not limited to, a profile image, first and last name, date of birth, gender, an email address, city, state, zip, pin and emergency code.

A journals 507 use case allows the user 501 to create a new journal (as described herein), which can be updated to add further notes to a journal entry. The journals 507 use case can provide an option to view and edit a journal entry. In addition, the journals 507 use case can provide an option to specify "things to consider" to assist the user 501 while entering information to a new journal entry. The location manager 502 records the smartphone's GPS location and a time-date stamp when the user 501 creates a new journal entry or edits a journal entry stored in a journal repository. The GPS location and the time-date stamp are tagged to each journal entry (either a new journal entry or edits to an existing journal entry) and are stored in the journal repository.

A reports 508 use case allows the user 501 to create a report from the consent repository or the journal repository (as described herein). The reports 508 use case can provide an option to view and edit an existing report. The location manager 502 provides the GPS location and the time-date stamp of the entries in the new report. A GPS location or the area around a GPS location can be used as a search item in order to generate a report of all entries having either the precise GPS location or having occurred in an area around a GPS location.

An emergency communication 509 use case allows the user to add an emergency contact and an emergency code. The emergency communication 509 use case allows the user to enter an emergency code, which activates an emergency message being sent to a linked contact, if the user feels threatened by another person in a potentially harmful situation or feels forced to accept a consent request. The location manager 502 attaches the GPS location and a time-date stamp to the emergency text message, so the linked contact can seek or provide protection for the user. In some configurations, the emergency communication 509 use case can include a 911 emergency code, which provide local authorities a distress message, the GPS location, the user's name and the other person's name. Upon activation of the emergency code, the emergency text tagged with the GPS location and time-date stamp are stored in the journals repository. If the system includes a 911 emergency code, the 911 text message tagged with the GPS location and the time-date stamp is stored in the journals repository. In some configurations, emergency communication 509 can include sending a test message to the emergency contact, as discussed below. In some configurations, the adding of an emergency contact includes creating the contents of the emergency text message.

A consent requests 510 use case allows the user to create and send a new consent request to another person. Furthermore, the consent requests 510 use case allows the user 501 to edit or withdraw the new consent request. The consent requests 502 use case provides the user 501 notification of an incoming request from another person and allows the user 501 to accept or decline the incoming request. The location manager 502 records the smartphone's GPS location and the time-date for any action initiated by the consent request 510 use case. The GPS location and the time-date are tagged to the action, all of which is stored in a consent repository.

A share consent app 511 use case allows the user 501 to share the app with a selected contact stored in the smartphone. A blocked users 512 use case allows the user to block consent requests from a contact stored in the smartphone. The blocked users 512 use case allows the user 501 to unblock a blocked contact. A list of all blocked contacts can be accessed through the blocked users 512 use case. A resources 513 use case allows the user to access various resources, such as, but is not limited to, websites, hotlines, definitions, hotlines, selected legal information, government agencies, contact information for support groups, and the like. These various resources in the resources 513 use case can be updated during app software updates or by the WebServer.

Figure 6:
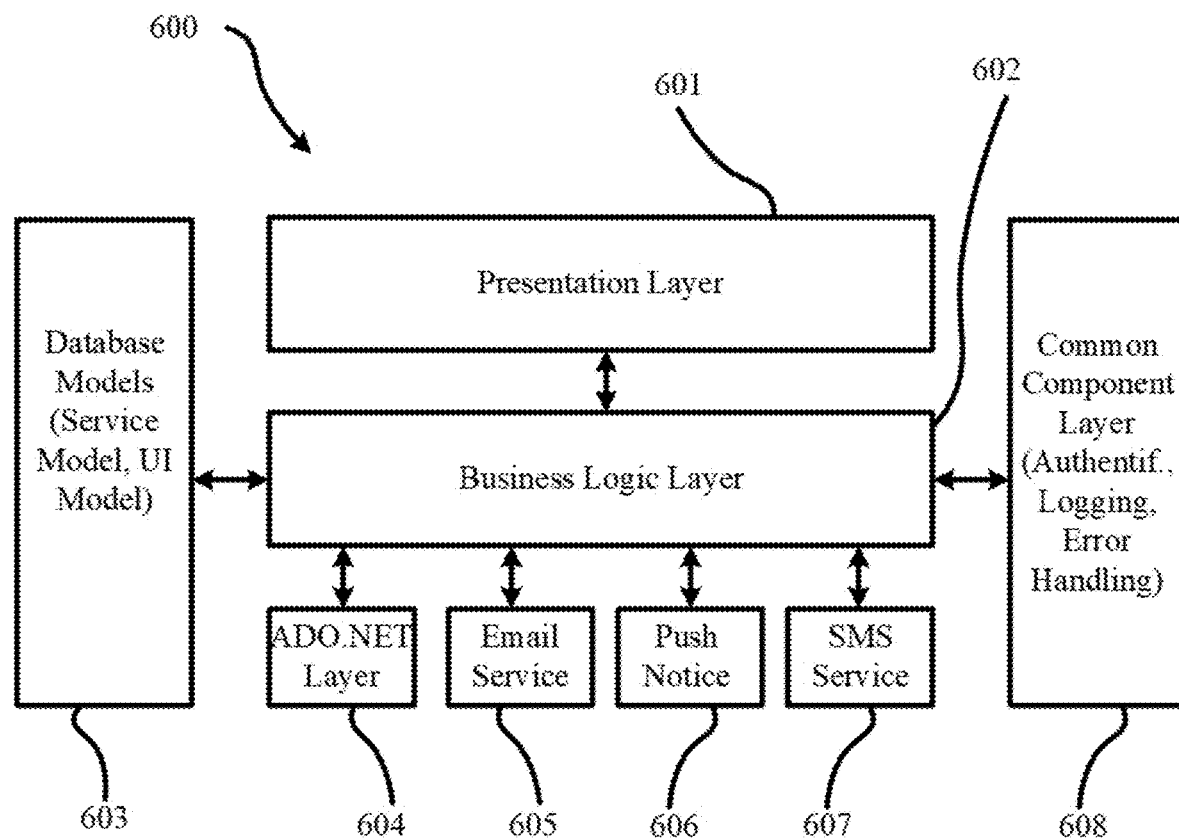
FIG. 6 is a block diagram illustrating various layers of a consent verification system, according to various embodiments.

In an example, a consent verification system can be built in N-tier architecture, which produces applications that are secure, reusable and easily manageable. As illustrated in FIG. 6, a consent verification system 600 can comprise a plurality of layers working together. A presentation layer 601 comprises components that implement and display a user interface and manage the user interaction. The presentation layer 601 provides the interface that the user sees and interacts with on the user's smartphone. In an example, the presentation layer 601 can be configured to have a home screen with a plurality of active buttons, which allow the user to access functions in the business logic layer 602. In some configurations, the presentation layer 601 can be the forward-facing component or front-end of the system.

The business logic layer 602 comprises all the core functionalities of the application. For example, features like user management, consent management, journals management, and the like, are located in the business logic layer 602. The business logic layer 602 interfaces with presentation layer 601 to provide information to the user and receive instructions from the user. The business logic layer 602 also interfaces with the data models layers 603 to enter information and data received from the user interaction with the system and to provide stored data to the user. In addition, the business logic layer 602 interfaces with an ADO.Net database layer 604, email service layer 605, push notification service layer 606, SMS serve layer 607, and a common component layer 608. In some configurations, the business logic layer 602, along with the ADO.Net database layer 604, the email service layer 605, the push notification service layer 606, the SMS serve layer 607, and the common component layer 608 can be the rear-facing component or the backend of the system.

The ADO.Net database layer 604 enables a relational data base using domain-specific objects. All code that is specific to the underlying data source, such as, for example, creating a connection to the database, calling stored procedures for insert, update and delete, is located in the ADO.Net database layer 604, which interfaces with the business logic layer 602. The database model layer 603 can consist of a SQL Server (RDBMS) which persists in all the application-specific data such as, user information, a consent repository, a journal repository, and resources.

The email service layer 605 consists of methods for sending emails to end-users using SendGrid. The push notification service layer 606 consists of methods for sending push notifications to end-users using Azure Notification Hub. The SMS service layer 607 consists of methods for sending SMS to end-users using Twilio.

The common components layer 608 contains common libraries or functionality that can be used in any of the above layers. The common components layer 608 can comprise features such as, for example, authentication, security, exception handling, and logging.

Figure 7:
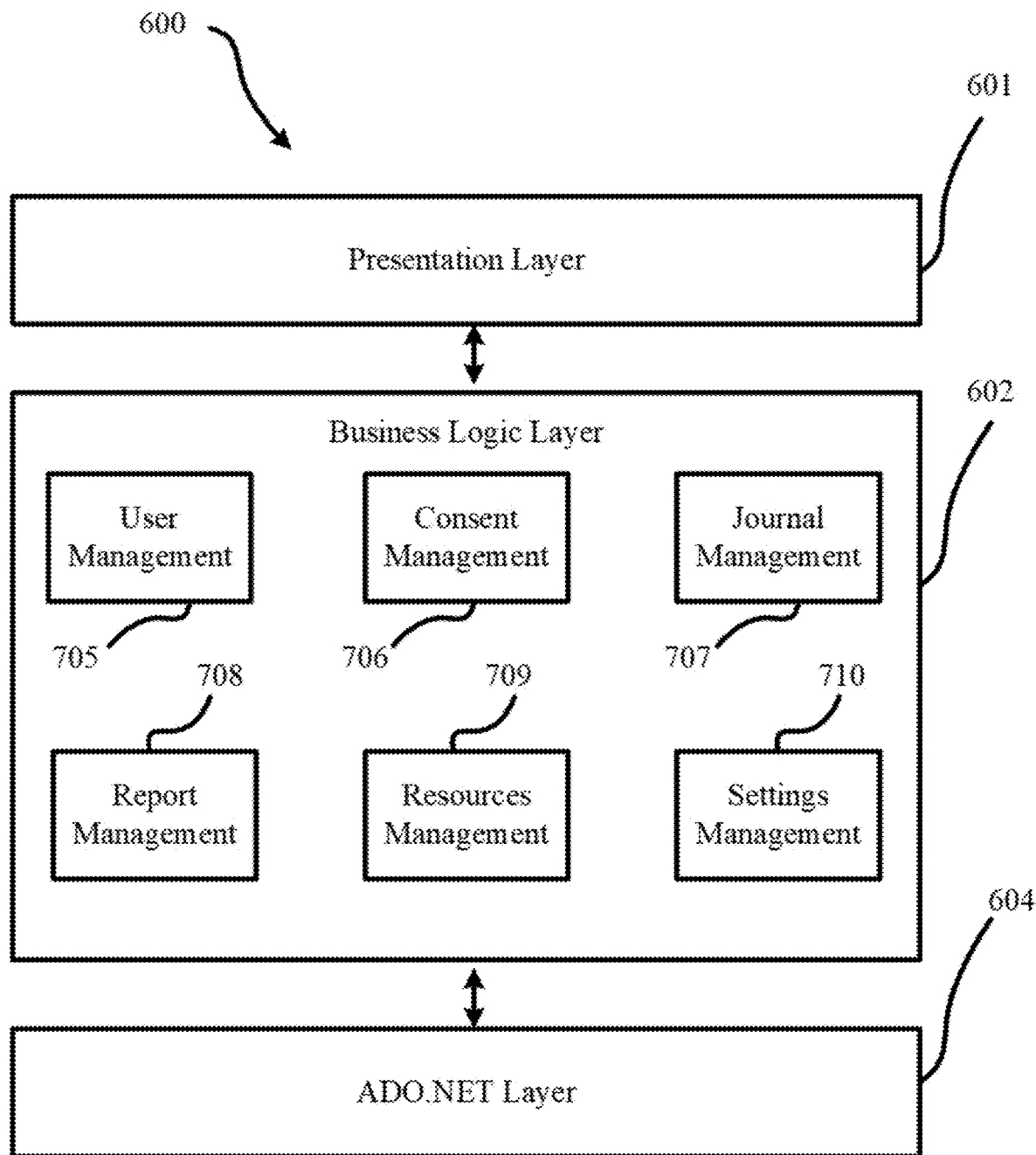
FIG. 7 is a block diagram illustrating various exemplary components in a business logic layer of a consent verification system, according to various embodiments.

Moving to FIG. 7, a block diagram illustrates components in a business logic layer 602. The consent verification system 600 can comprise a presentation layer 601 interfacing with a business logic layer 602 interfacing with a data base layer 604. The business logic layer 602 can comprise a user management module 705, a consent management module 706, a journal management module 707, a report management module 708, a resources management module 709, and a settings management module 710.

The user management module 705 can be configured to handle functions such as, for example, user signup, user login, email verification, phone verification, and user deletion. The consent management module 706 can be configured to handle consent requests including add, approve, and cancel functionalities. The consent management module 706 can interface with the consent repository. The journal management module 707 can be configured to handle a journal entry, along with time stamping, location tagging and archiving the journal entry. The journal management module 707 can interface with the journal repository.

The report management module 708 can be configured to allow a user to generate a report from either the consent repository or the journal repository. The report module 708 is in communication with one or more databases to pull the requested data, which is put into a report. In some implementations of the system, an administrator can access the report module 708 and request a report on a user or a report consisting of data from a group of users. For example, the administrator may receive a subpoena demanding a record of the user's activity with a party that has received one or more consent requests from the user. In another example, the administrator may receive a subpoena demanding all journal entries from a user related to a particular person, a time period, and/or within a described geolocation. Examples of generating reports consisting of data from a group of users can include corporations monitoring to determine the risk exposure created by the actions of an employee to determine if a behavioral pattern exists, after the complaint is filed, for the person against whom the complaint is made. Furthermore, a report from a group of users can be used by a human resource department to determine if proactive measures, such as training, or reorganization of staff, are needed.

The resources management module 709 can be configured to manage various resources, such as, but is not limited to, websites, articles, hotlines, FAQs, definitions, hotlines, selected legal information, government agencies, contact information for support groups, and links to other resources. The resources management module 709 interfaces with a resources database, which can be updated from time to time by the administrator. The settings management module 710 is configured to enter and/or adjust various settings in the system, such as, for example, phone settings, blocked users, and do-not-disturb hours.

In reference to FIGS. 1 and 7, the home screen 100 and its plurality of buttons in a smart device is located in the presentation layer 601, which interfaces with the business logic layer 602. For example, activation of the journals button 103 accesses the journal management module 707. Activation of reports management button 104 accesses the report management module 708. Activation of the resources button 105 accesses the resources management module 709. Activation of the settings button 106 accesses the settings management module 710. Activation of the profile button 107 accesses the user management module 705. Activation of the blocked users button 108 accesses the settings management module 710. Activation of the consent request button 110 accesses the consent management module 706.

With reference to FIGS. 5 and 7, the various use cases 500 can be mapped to certain modules of business logic layer 602. The consent management module 706 can provide the resources for the execution of the consent requests 510 use case. In some configurations, the consent management module 706 can provide the resources for the execution of the emergency communication 509 use case. The journal management module 707 can provide the resources for the execution of the journals 507 use case. In some configurations, the journal management module 707 can provide the resources for the execution of the emergency communication 509 use case. The report management module 708 can provide the resources for the execution of the reports 508 use case. The resources management module 709 can provide the resources for the execution of the resources 513 use case. The settings management module 710 can provide the resources for the execution of the profile 506 use case. In addition, the settings management module 710 can provide the resources for the execution of the blocked user 512 use case. In some configurations, the settings management module 710 can provide the resources for the execution of the login 505 use case.

Figure 8:
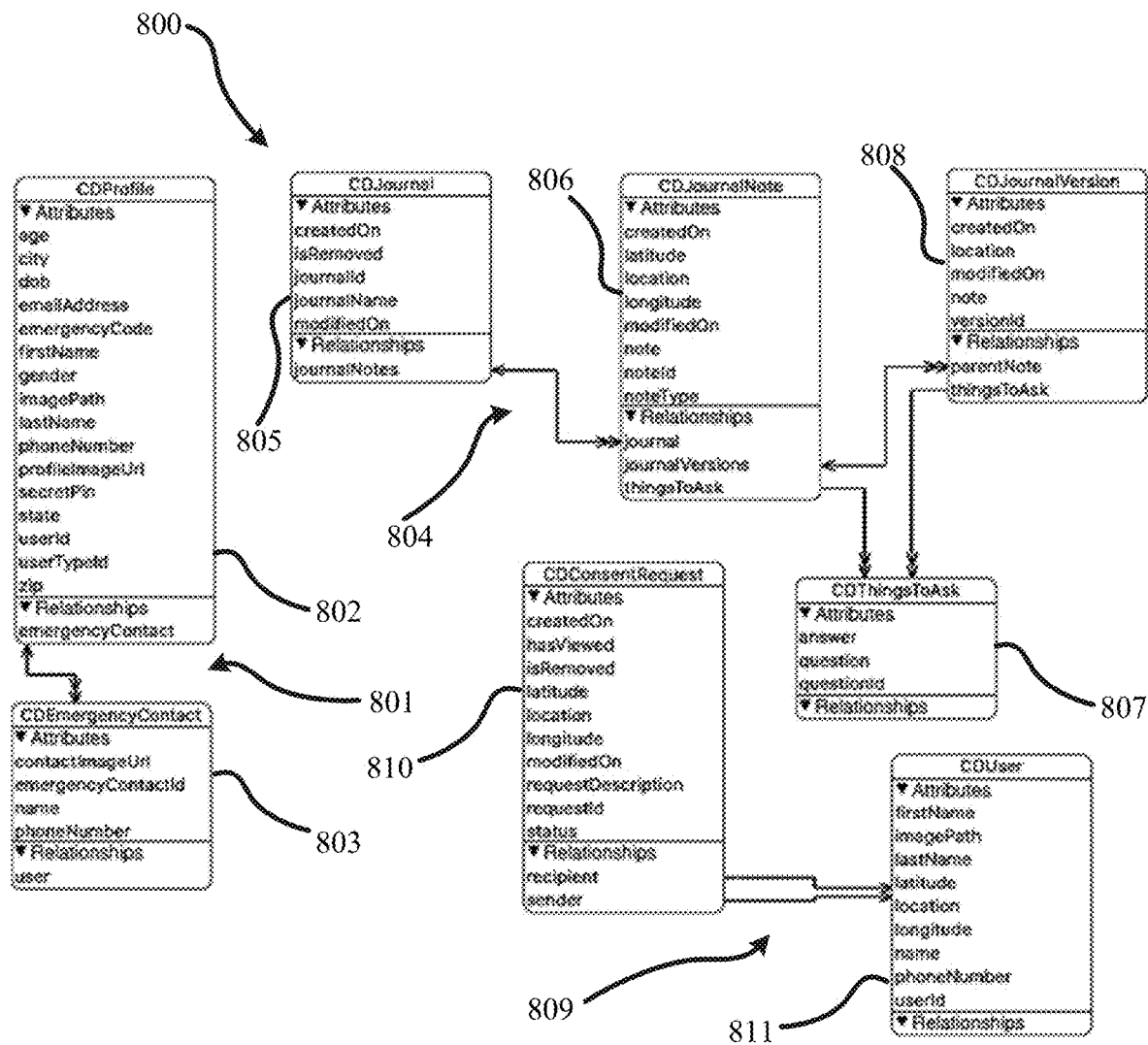
FIG. 8 is a block diagram illustrating an exemplary database structure for a consent verification system, according to various embodiments.

Now turning to FIG. 8, a block diagram illustrates an exemplary database structure for a consent verification system. The database system 800 comprises at least five independent databases, which are linked to a user account. The database system 800 can comprise a profile database 801, a journal database 804, and a consent database 809.

The profile database 801 can comprise a profile core data 802 and an emergency core data 803. The profile core data 802 includes appropriate user data, such as, but is not limited to, user name, address, date of birth, phone number, email, gender, user ID, user image, secret pin (acceptance code), and emergency code. One or more pieces of data in the profile core data 802 can be automatically pulled from the user's smartphone. The emergency core data 803 includes emergency contact information. The emergency core data 803 is related to the emergency code in the profile core data 802. The emergency core data 803 can be pulled from a selected contact in a user's contact list on the user's smartphone.

The journal database 804 comprises a journal core data 805, a journal note (also referred to herein as "journal entry") core data 806, a journal version core data 807, and a "things to ask" core data 808. The journal core data 805 includes the journal name, the journal ID, the creation date, and any date of modification. The journal core data 805 is related to the journal note core data 806 and the date of modification is recorded by the journal note core data 806 then reported to the journal core data 606. The journal note core data 806, the journal version core data 807, and the things to consider core data 808 are related to each other. In some embodiments, a journal repository comprises the journal database 804.

The consent database 809 comprises a consent request core data 810 and one or more user core data 811. The consent request core data 810 includes data on consent requests created, sent, modified, withdrawn and received. The user core data 811 corresponds to the core data from the person to whom a consent request was sent (as well as, modified or withdrawn) or from whom a consent request was received by the user. The user core data 811 includes various identifying information from the person and the text of any communications between the user and the person regarding a consent request, of which each communication is electronically stamped and tagged with the GPS location and time-date in real time when such communication is created. In some embodiments, a consent repository comprises the consent database 809.

Figure 9:
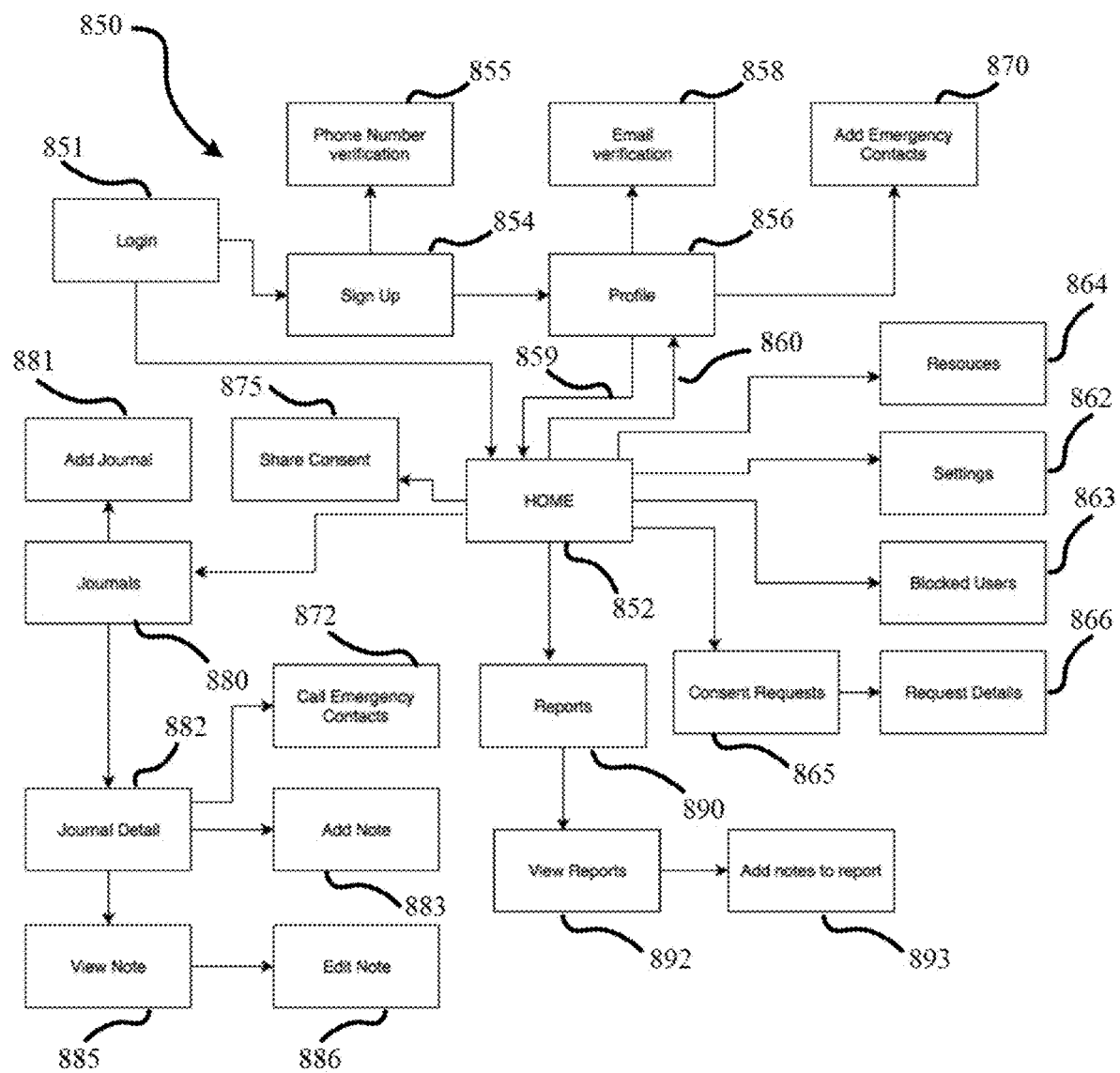
FIG. 9 is a block diagram illustrating an exemplary work flow of a forward-facing component of a consent verification system, according to various embodiments.

FIG. 9 is a block diagram illustrating an exemplary work flow of a forward-facing component 850 of a consent verification system. In some configurations, the forward-facing component 850 can be a consent verification application installed and operating on a smartphone. The forward-facing component 850 interfaces with a rear-facing component, such as, for example, the exemplary rear-facing component 900 illustrated in FIG. 10.

The forward-facing component 850 starts at a login 851, which requires a user to complete a sign up 854 routine upon the initial login. The sign up can include phone number verification 855, which verifies the smartphone that is running the consent verification application. The smartphone can receive a text message from the phone number verification 855 that allows the user to move to profile 856. The user can fill in a form to create a profile 856. As described herein, the profile 856 can include, but is not limited to, at least one of a user name, a login password, an acceptance code, a user phone number, a user email, a user date of birth, a user gender, and a user address. In some configurations, the creating of the profile 856 can include an email verification 858, which requests the user to enter the user's email address. A code is sent to the user's email address, which is entered into the profile 856 to continue the creating the profile 856.

In addition, the profile 856 can include adding an emergency contact 870. An emergency code can be created by the user, which when activated sends an emergency text message tagged with the GPS location of the smartphone to the emergency contact. In some configurations, the adding of an emergency contact 870 includes the creating of the contents of the emergency text message. In some configurations, the adding of the emergency contact 870 can include the sending a test message to the emergency contact, as discussed below. The adding of the emergency contact 870 can be as simple as linking a contact from the smartphone to the consent verification application. Of course, the of adding emergency contact 870 can include more than one contact linked to the consent verification application. In some embodiments, the of adding an emergency contact 870 can include adding a 911 code, which, when activated, sends a distress message tagged with the GPS location of the phone, the user's name and the other person's name to a 911 call center requesting that authorities respond to a sexual assault happening to the user by the other person at the GPS location.

If the user has been registered into the system, the login 851 takes the user to a home page 852. The user can access 860 the profile 856 from the home page 852 to edit, modify, update, or delete the profile 856 and then return 859 to the home page 852. From the home page 852, the user can access resources 864, settings 862, share consent app 875, and blocked users 863, all of which have been described in detail herein.

From the home page 852, the user can access consent requests 865, which allows the user to create and send a consent request to another person, withdraw a pending sent consent request, or reply (accept or deny) to a received consent verification request from any other person. In some configurations, the consent requests 865 allows the user to modify a sent request or to reply to a received request with a modified response to the received request. All communications in the consent requests 865 are in application communications between the user and the other person. In other words, all communications in the consent requests 865 are private and do not use the standard text messaging applications available on most smartphones.

All communications in the consent requests 865 are recorded and are time-date stamped and tagged with the GPS of the smartphone then saved in a consent repository for each of the user and the other person involved in the communications. A review details 866 allows the user to review details of at least one of a received consent request, a pending sent consent request, and a withdrawn request. In some configurations, the user can activate the emergency code in the consent requests 865 to send an emergency text with the GPS location to the emergency contact.

From the home page 852, the user can access journals 880, which allows the user to create, edit, and store one or more journal notes (also referred to herein as "journal entries"). Add journal 881 allows the user to create a new journal entry, which is time-dated stamped and tagged with the GPS location. A journal entry can be located using journal details 882. Once the journal entry is located, the journal entry can be viewed via view notes 885, then edit note 886 allows the user to edit the journal entry, which is time-date stamped and tagged with the GPS location. Add note 883 can comprise a virtual assistant that asks the user questions, which are answered in the journal entry thus capturing the information needed to document a harassment or an abuse event experienced by the user. All journal entries including edits to journal entries and additions to journal entries are time-date stamped and tagged with a GPS location then stored in the journal repository.

In some configurations, reports 890 allows the user to create a report from the data stored in either the consent repository or the journals repository. For example, such a report could be generated from data stored in the consent repository based on the consent request communications over a date range, the consent request communications in a geolocation or only on the communication with a particular individual. Likewise, a report could be generated from data stored in the journals repository based on the journal entries over a date range, the journal entries from a geolocation or only on the journal entries for a particular individual. Once a report is generated, view reports 892 allows the user to review the report, download the report, and/or print the report. After a report has been generated, add notes to report 893 allows the user to add notes to the report and the added notes are time-date stamped and tagged with the GPS location, then stored with the report in a report repository.

In some applications, the home page 852 can be substantially similar to the exemplary home page 100, as illustrated in FIG. 1. Using this example, access to the profile 856 could be via the profile button 107 on the home page 100. Access to the resources 864 could be via the resources button 105 on the home page 100. Access to the settings 862 could be via the settings button 106 on the home page 100. Access to the blocked users 863 could be via the blocked users button 108 on the home page 100. Access to the share request 875 could be via the share consent depot button 111 on the home page 100. Access to the consent requests 865 could be via the consent requests button 110 on the home page 100. Access to the journals 880 could be via the journals button 103 on the home page 100. Access to the reports 890 could be via the reports button 104 on the home page 100.

In some configurations, the front-facing component 850 can execute various exemplary use cases, as illustrated in FIG. 5. Using this example, the login 851 can execute the login use case 505. The profile 856 can execute the profile use case 506. The journals 880 can execute the journals use case 507. The reports 880 can execute the reports use case 508. The call emergency contacts 872 can execute the emergency communication use case 509. The consent request 865 can execute the consent requests use case 510. The share consent 872 can execute the consent request use case 511. The blocked users 863 can execute the blocked users use case 512. The resources 864 can execute the resources use case 513.

Figure 10:
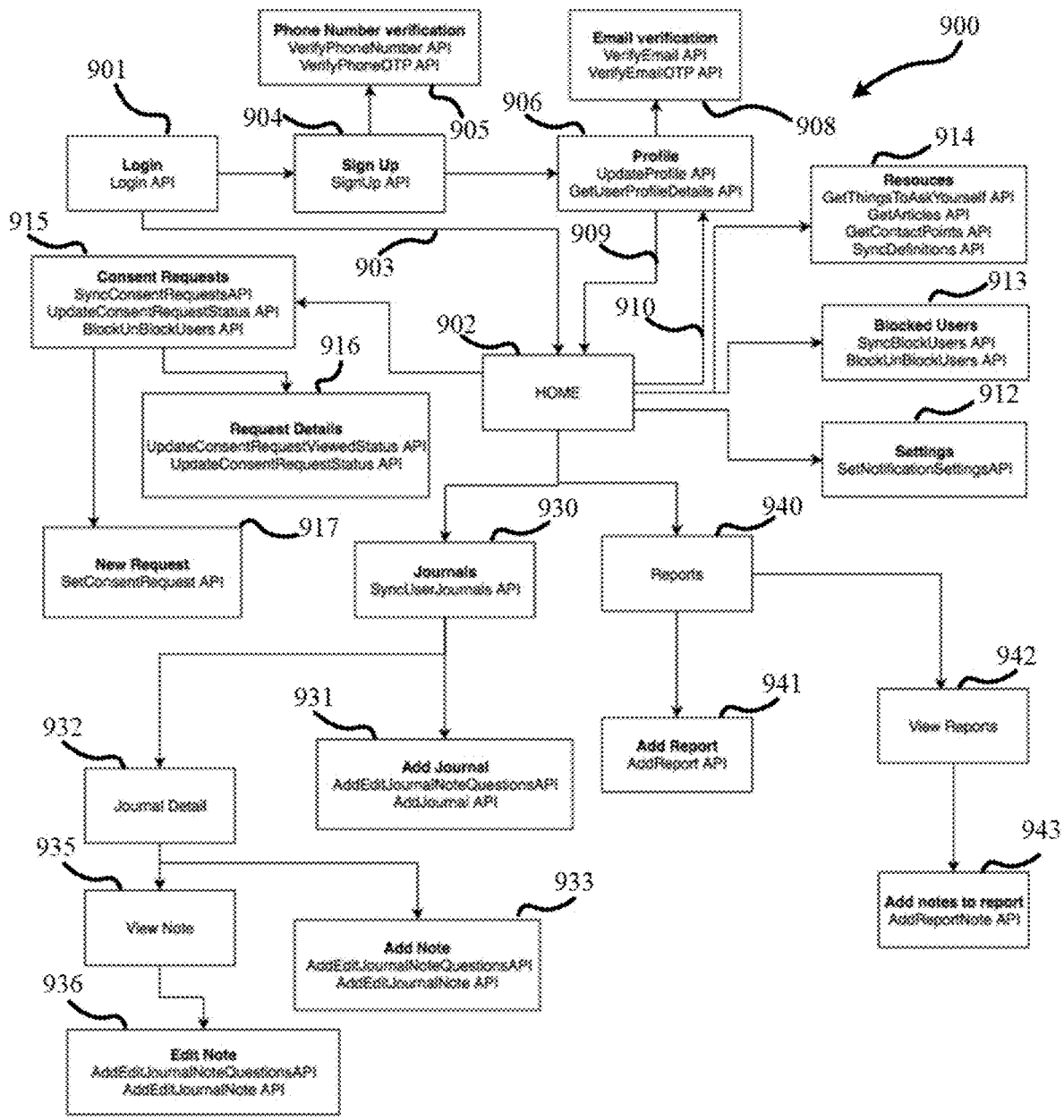
FIG. 10 is a block diagram illustrating an exemplary WebServices of a rear-facing component of a consent verification system, according to various embodiments.

FIG. 10 is a block diagram illustrating an exemplary WebServices of a rear-facing component 900 of a consent verification system. In some configurations, the rear-facing component 900 can comprise a plurality of application programming interfaces ("APIs") operating in a cloud environment. The rear-facing component 900 interfaces with a front-facing component, such as, for example, the exemplary front-facing component 850 illustrated in FIG. 9. A login 901 can comprise a login API which requires a user, upon the initial login, to complete signup 904 comprising a signup API. The sign up 904 can include phone number verification 905, which employs various APIs to verify the smartphone running the consent verification application. The smartphone can receive a text message from the phone number verification 905 that allows the user to move to profile 906, which comprises various APIs to create and update a user profile. In some configurations, the profile 906 can include an email verification 908, which employs various APIs that request the user to enter the user's email address and then sends a code to the user's email address, which is entered to allow the entry of the user profile.

If the user has been registered into the system, the login 901 takes the user to a home page 902. The user can access 910 the profile 906 from the home page 902 to edit, modify, update, or delete the user profile and then return 909 to the home page 902. From the home page 902, the user can access resources 914, settings 912, and blocked users 912, all of which have been described in detail herein.

Referencing the forward-facing component 850 illustrated in FIG. 9, the login 851 interfaces with the APIs of the login 901. The sign up 854 can interface with the APIs of the signup 904. The phone number verification 855 can interface with the APIs of the phone number verification 905. The profile 856 can interface with the APIs of profile 906. The email verification 858 can interface with the APIs of email verification 908. The home page 852 can interface with APIs of the home page 902. The resources 864 can interface with the APIs of the resources 914. The settings 862 can interface with the APIs of the settings 912. The blocked users 863 can interface with the APIs of the blocked users 913.

From the home page 902, the user can access consent requests 915, which comprise APIs that allows the user to control consent requests including synchronizing consent and updating consent requests. From the consent requests 915, the APIs of request details 916 allows the user to review the status of the pending and/or received consent requests. The APIs of new request 917 allows the user to create and send a consent request to another person, withdraw a pending sent consent request, or reply (accept or deny) to a received consent verification request from any other person. All communications related to consent requests are time-date stamped and tagged with a GPS location then stored in the consent request repository.

From the home page 902, the user can access journals 930, which comprises APIs that allow the user to create, edit, and store one or more journal notes (also referred to herein as "journal entries"). Add journal 931 comprises APIs that allow the user to create a new journal entry, which is time-dated stamped and tagged with the GPS location. A journal entry can be located using journal details 932. Once the journal entry is located, the journal entry can be viewed via view notes 935 then edit note 936 comprises APIs that allow the user to edit the journal entry, which is time-date stamped and tagged with the GPS location. Add note 933 comprises APIs, which provide a virtual assistant that asks the user questions that are answered in the journal entry thus capturing the information needed to document a harassment or an abuse event experience by the user. All journal entries including edits to journal entries and additions to journal entries are time-date stamped and tagged with a GPS location then stored in the journal repository.

From the home page 902, the user can access reports 940, which can comprise APIs to create a report from the data stored in either the consent repository or the journals repository. Add report 941 comprises APIs for generating a report generated from data stored in the consent repository, which can be based on the consent request communications over a date range, the consent request communications in a geolocation or only on the communication with a particular individual. Likewise, add report 941 comprises APIs for generating a report generated from data stored in the journals repository based on the journal entries over a date range, the journal entries from a geolocation or only on the journal entries for a particular individual. Once a report is generated, view reports 942 allows the user to review the report, download the report, and/or print the report. After a report has been generated, add notes to report 943 comprises APIs, which allow the user to add notes to the report and the added notes are time-date stamped and tagged with the GPS location, then stored with the report in a report repository.

Referencing, again, the forward-facing component 850 illustrated in FIG. 9, the consent requests 865 interfaces with the APIs of the consent requests 915 and the new request 917. The request details 866 interfaces the APIs of the request details 916. The journals 880 interfaces with the APIs of the journals 930. Likewise, add journal 881 interfaces with add journal 931; journal details 882 interfaces with journal detail 932; view note 885 interfaces with view note 935; add note 883 interfaces with add note 933; and edit note 886 interfaces with edit note 936. The reports 890 interfaces with the APIs of the reports 940 and add report 941. In addition, the view reports 892 interfaces with the view reports 942; and the add notes to the report 893 interfaces with the add notes to the report 943.

Figure 11:
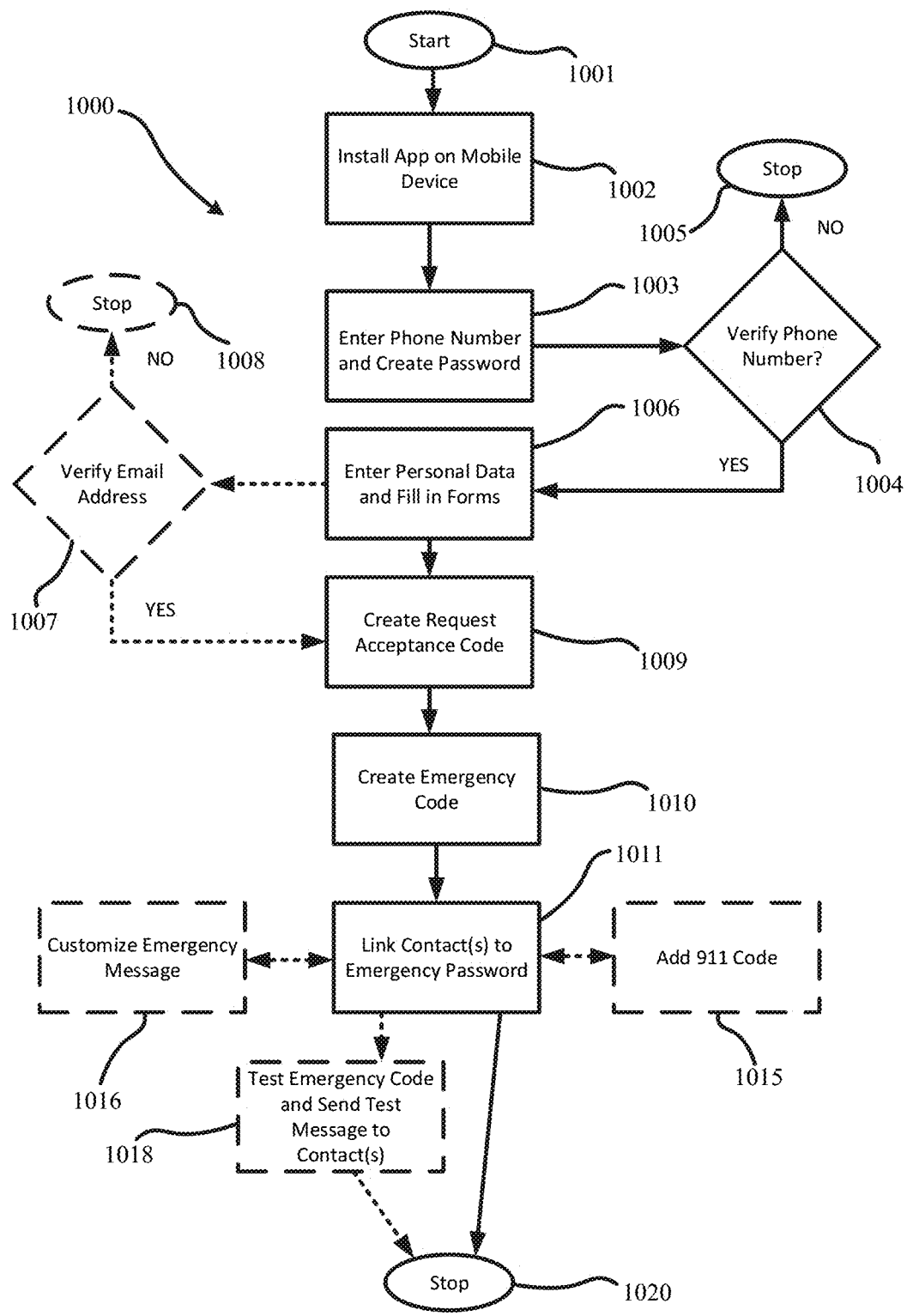
FIG. 11 is a flow chart illustrating an exemplary method of creating a profile for a consent verification system, according to various embodiments.

FIG. 11 is a flow chart illustrating an exemplary method 1000 of creating a profile for the consent verification system. Note that boxes outlined in dashed lines are optional steps, which may or may not be included in various embodiments of the method 1000. A START 1001 of the method 1000 is an installation step 1002. The installation step 1002 can include a user downloading a consent verification application onto a mobile device (such as a smartphone or smart tablet) and installing the application onto the mobile device. The create password step 1003 then follows. The create password step can include a user creating a password and then entering the user's phone number.

This is followed by a phone number verification step 1004. The consent verification application sends the entered phone number to a webserver of consent verification system. The webserver verifies the entered phone number. If the result of the phone verification step 1004 is NO, then go to STOP 1005. If the result of the phone verification step 1004 is YES, then continue to a create profile step 1006.

The create profile step 1006 can include entering personal data, such as, but is not limited to, name, address, date of birth, gender, etc. The personal data can be entered by filling forms generated by the application. The personal data can include an email address.

The create profile step 1006 can be followed by a create request acceptance password step 1009. However, optional step of verification of email step 1007 can be placed between these two steps. In the verification of email step 1007, the application sends the entered email to the webserver, which verifies the entered email address. If the result of the email verification step 1007 is NO, then go to STOP 1008. If the result of the email verification step 1007 is YES, then continue to the create acceptance password step 1009.

The create acceptance password step 1009 includes the user entering a secret password, which is used to accept a consent request. The next step is to create the emergency password 1010, in which the user creates a separate password, which is activated if the user feels threatened by another person in a potentially harmful situation and feels forced to accept a consent request. This step is followed by a link contact step 1011. In this step the user links one or more contacts, which are stored on the mobile device, to the emergency contact password. This allows the linked contact to receive an emergency text message from the user when the emergency password is activated.

In optional customize emergency message step 1016, the application allows the user to customize the emergency text message and stored it in the application. In optional add 911 password step 1015, the application allows the user to add a 911 password, which when activated send a distress text message to a 911 service pleading for police assistance to prevent harm or to intervene for an assault in progress to the user.

After the link contact 1011, go to STOP 1020. However, optional test emergency password step 1018 can be included in some variations of the method. The test emergency password allows the user to activate the emergency password in a test mode which sends the emergency text to a linked contact. This step provides a level of assurance to the user that the emergency password works. In addition, the user can communicate with the linked contact to confirm receipt of the emergency text then discuss what the emergency text means and what appropriate action should be taken to help the user out of a threatening situation.

Figure 12:
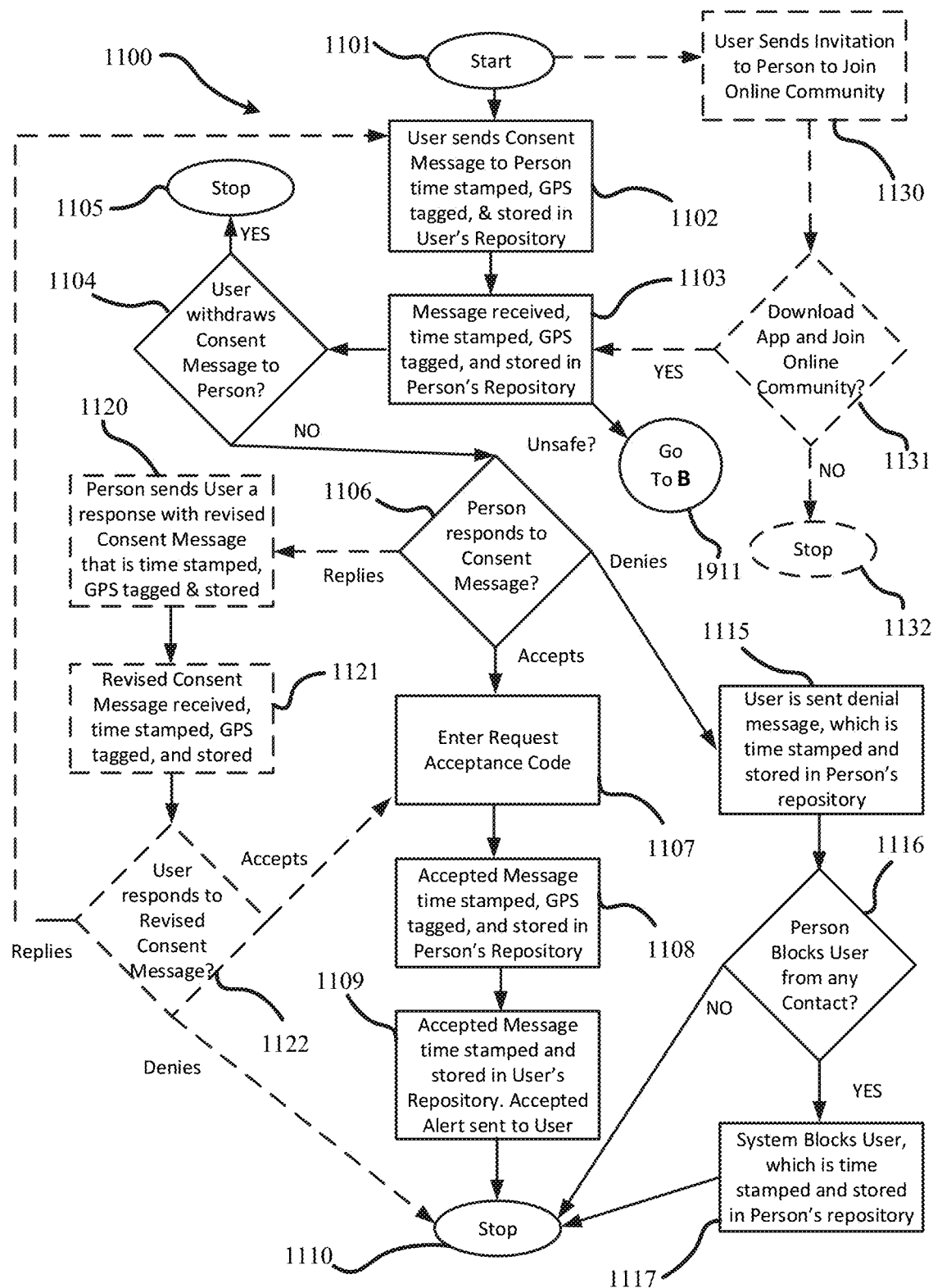
FIG. 12 is a flow chart illustrating an exemplary method of consent verification, according to various embodiments.

FIG. 12 is a flow chart illustrating an exemplary method 1100 of a consent verification, according to various embodiments. To START 1101 the method 1100, a user sending a consent message 1102. For example, the user sends a consent message to another person and the consent message is time-date stamped, tagged with the GPS location and stored in the user's consent repository. Then the message is received 1103. The consent message is received by the other person and the message is time-date stamped, tagged with the GPS location and stored in the person's consent repository. The user can withdraw the consent message at any time. Does user withdraw the consent message 1104 to the person? If YES, then goes to STOP1105.

If NO, does the person respond 1106 to the consent message? If the person denies then the user is sent a denial message 1115, which is time stamped and tagged with the GPS location then stored in the person's consent repository. The denial message is received by the user and is time stamped and tagged with the GPS location then stored in the user's consent repository. Then does the person block the user 1116 from any future contact? If YES, the system blocks the user 1117 from user contact with the person, which is time stamped and tagged with the GPS location and stored in the person's repository. The method then goes to STOP 1110. If NO, then go to STOP 1100.

In some embodiments, all attempts to contact the person by a blocked user are recorded with a time-date stamp and a geolocation and stored in the person's journal repository. The person can generate a report from the journal repository to determine if the blocked user is cyber stalking the person. In some embodiments, all attempts to contact the person by a blocked user are recorded with a time-date stamp and a geolocation by the administrator and stored in a database. Upon a request (from the person, a court, or other entity), the administrator can provide a report on the activities of the blocked user involving the person including the attempts to contact the person after the user has been blocked.

If the person accepts, then the person enters their unique acceptance code, which is time stamped, tagged with the GPS location and stored in the person's consent repository 1108. The accepted consent message is received 1109 by the user and is time stamped, tagged with the GPS location and stored in the user's consent repository. Then the method goes to STOP1110.

Optionally, the person replies by sending the user a revised consent message 1120, which is time stamped, tagged with GPS location and stored in the person's consent repository. The revised consent message is received by the user 1121, which is time stamped, tagged with GPS location and stored in the user's consent repository. Does the user respond 1122 to the revised consent message? If the user accepts, the user enters the user's unique acceptance code 1107 the accepted message is received by the person 1108, which is time stamped, tagged with GPS location and stored in the person's consent repository. The acceptance is recorded in the user's consent repository 1109, which is time stamped, tagged with GPS location and stored in the person's consent repository. Then the method stops 1110. If the user denies, then go to STOP1110. If the user replies, then go back to the top of the flowchart where user sends consent message 1102 to another person.

In one optional application, if the person does not have the consent verification application on their smartphone when the method starts 1101, the user can send the person an invitation 1130 to download the application. Next, does the person download the consent verification application 1131 and register? If YES, then go to message received 1103. If NO, then go to STOP1132

Figure 13:
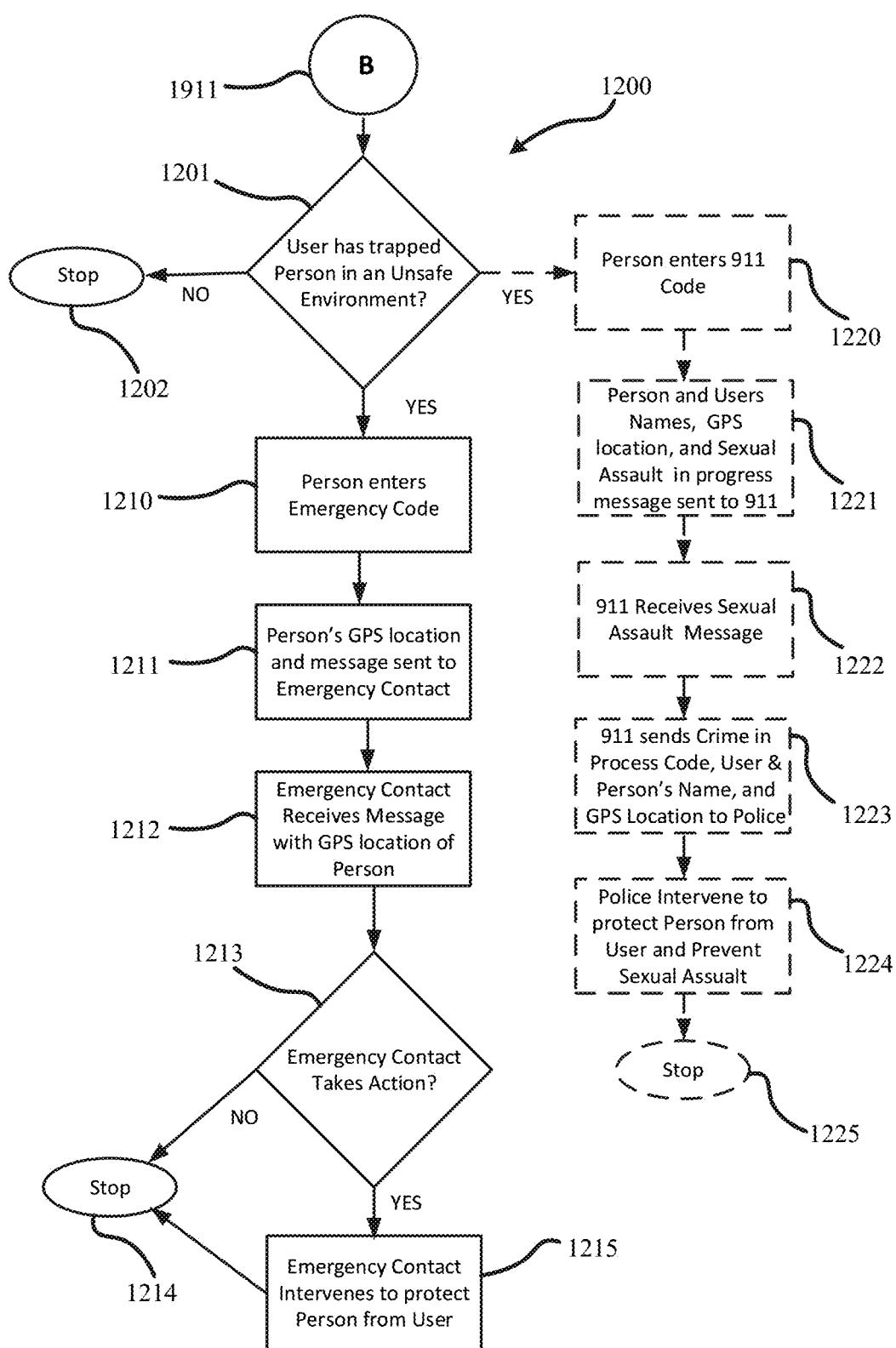
FIG. 13 is a flow chart that is connected to the flow chart of FIG. 12, which illustrates exemplary methods of emergency communication, according to various embodiments.

If the person feels unsafe when the consent message is received 1103 by the person, then go to B 1911, which is described in FIG. 13.

FIG. 13 is a flow chart that is connected to the flow chart of FIG. 12, which illustrates methods of emergency communication. B 1911 is the start of a method of sending an emergency communication 1200. The user has trapped the person in an unsafe environment? If NO, then go to STOP 1202. If YES, then the person enters an emergency code 1210 into the consent verification application. The consent verification application sends an emergency text message, along with the person's GPS location to an emergency contact 1211. The emergency contact receives the emergency text and the GPS location 1212. Does the emergency contact take action? If NO, go to STOP 1214. If YES, the emergency contact intervenes to protect the person from the user 1215. Then the method goes to STOP 1214.

In some configurations, the method 1200 also comprises sending a distress message to a 911 call center. For example, has the user trapped the person in an unsafe environment? If YES, the person enters a 911 code into the consent verification application. The consent verification application sends a distress message to a 911 call center 1221. The distress message can comprise the person's name, the user's name, the GPS location and a text message alerting the authorities that a sexual assault is in progress. The 911 call center receives the distress message 1222. The 911 call center sends a crime in process code, the person's name, the user's name, and the GPS location to the local police. 1223. The police intervene to protect the person from the user and may prevent a sexual assault 1224. Then the method goes to STOP 1225.

The methods and systems for consent verification, as disclosed herein, can be employed in numerous different applications. Such methods and systems for consent verification can be employed by individuals as well as by corporations, academic institutions, health care facilities, and governmental agencies.

In a corporate environment, a consent verification system can be configured to collect data anonymously. However, the data can be analyzed after a complaint to determine if a behavioral pattern exists for the person against whom the complaint is made. This analysis can help a company determine the risk exposure created by an employee or decide if proactive measures, such as training, or reorganization of staff are needed. In a corporate environment, a journal entry related to an employee can also be viewed with proper consent by the company to identify brewing issues related to harassment.

Various embodiments provide a method for initiating and storing consent verification between a user and another person planning to engage in an intimate activity. The method can include the steps of preparing a consent request by the user; sending the consent request to the person; time-stamping the sending the consent request with the time and date; recording the GPS location of the sending of the consent request; and receiving the consent request by the other person.

The method can include the steps of: preparing a consent response by the person; sending the consent response to the user; time-stamping the sending the consent response with the time and date; recording the GPS location of the sending the consent response; and storing the consent response tagged with the time stamp and the recorded GPS location, in both the database for the user and the database for the other person.

In some embodiments, the method can include the steps of: accepting the consent request by the person; agreeing to the consent request to engage in intimate activity between the user and the other person; time-stamping the agreeing to the consent request with the time and date; recording the GPS location of the agreeing to the consent request; and receiving the agreeing to the consent request by the user; storing the agreeing to the consent request tagged with the time stamp and the recorded GPS location, in both the database for the user and the database for the other person.

In some embodiments, a consent verification system comprising: a consent request module configured to provide private consent communication and document consent verification between a user and another person planning to engage in an intimate activity, and to store all the consent communications and the consent verification tagged with a GPS location and a time-date stamp in a consent repository; a journal module configured to record a journal entry documenting harassment or abuse perpetrated by another on the user, and to store the journal entry tagged with a GPS location and a time-date stamp in a journal repository; a reports module configured to generate a report from data stored in at least one of the consent repository and the journal repository; and a resources module configured to educate the user on least one of consent, sexual harassment, abuse, and assistance, and to store resources for least one of consent, sexual harassment, abuse, and assistance in a resources repository The consent verification system can further comprise a user profile comprising an emergency contact and at least one of a user name, a user phone number, a user email, a user date of birth, a user gender, and a user address.

The consent verification system can further comprise an emergency code configured to automatically send an emergency text message and a GPS location to the emergency contact upon activation. In some configurations, the emergency text is tagged with the GPS location and a time-date stamp and stored in the journal repository.

The consent verification system can further comprise a 911 code configured to automatically send a distress text message, a GPS location, the user's name and the other person's name to a 911 call center. In some configurations, the distress text message is tagged with the GPS location and the time-date stamp and stored in the journal repository.

In some configurations, the resources repository comprises at least one of a website, an article, a hotline, a definition, legal information, contact information for government agencies, and contact information for support groups. In some configurations, the journal module further comprises a virtual assistant configured to prompt the user to enter information into a new journal entry.

Some embodiments provide a method for initiating and storing consent verification between a user and another person to engage in an intimate activity.

The method comprises: preparing a consent request by the user; sending the consent request to the person; time-stamping the sending of the consent request with the time and date; recording the GPS location of the sending of the consent request; and receiving the consent request by the other person; storing the consent request tagged with the time stamp and the recorded GPS location, in both a database for the user and a database for the person.

The method can further comprise further preparing a consent response by the other person; sending the consent response to the user; time-stamping the sending the consent response with the time and date; recording the GPS location of the sending of the consent response; and storing the consent response tagged with the time stamp and the recorded GPS location, in both the database for the user and the database for the other person.

The method further comprises ignoring the consent request by the person. The method further comprises blocking the user from contacting the person. The method further comprises storing an identity of the user blocked the person in a profile of the person.

The method further comprises unblocking the user and allowing the user to contact the person. The method comprises sending a notice to the user that the other person has blocked the user from further contact.

The method further comprises: withdrawing the consent request by the user; time-stamping the withdrawing of the consent request with the time and date; recording the GPS location of the withdrawing of the consent request; and receiving a withdrawal of the consent request by the person; storing the withdrawal of the consent request tagged with the time stamp and the recorded GPS location, in both the database for the user and the database for the other person.

The method further comprises sending by the user a link for installing a consent verification application on a device of another person.

The method further comprises accepting the consent request by the other person; agreeing to the consent request to engage in the intimate activity between the user and the other person; time-stamping the agreeing to the consent request with the time and date; recording the GPS location of the agreeing to the consent request; and receiving confirmation of the agreeing to the consent request by the user; storing the agreeing to the consent request tagged with the time stamp and the recorded GPS location, in both the database for the user and the database for the other person.

The method can further comprise revising terms of the consent request by the user; adding the revised terms to the consent response; and storing the revised terms of the consent response tagged with the time stamp and the recorded GPS location, both the database for the user and the database for the other person.

The method can further comprise preparing a consent answer to the revised terms of the consent response by the user; sending the consent answer to the person; time-stamping the sending the consent answer with the time and date; recording the GPS location of the sending of the consent answer; and storing the consent answer tagged with the time stamp and the recorded GPS location, both the database for the user and the database for the other person.

The method further comprises accepting the consent response by the user; agreeing to the revised terms of the consent response to engage in the intimate activity between the user and the other person; time-stamping the agreeing to the revised terms of the consent response with the time and date; recording the GPS location of the agreeing to the revised terms of the consent response; and receiving the agreeing to the revised terms of the consent response by the other person; storing the agreeing to the revised terms of the consent response tagged with the time stamp and the recorded GPS location, in both the database for the user and the database for the other person.

Some embodiments provide a consent verification system comprising: a consent request module comprising a smartphone application configured to provide in-app text communication and documentation of consent verification between a user and another person; a consent repository configured to store all in-app text communications tagged with a GPS location and a time-date stamp; a journal module configured to record an in-app journal entry documenting harassment or abuse perpetrated by another on the user; a journal repository configured to store all in-app journal entries, each journal entry tagged with a GPS location and a time-date stamp; a reports module configured to generate a report from data stored in at least one of the consent repository and the journal repository; and a resources module comprising at least one of a website, an article, a hotline, a definition, legal information, contact information for government agencies, and contact information for support groups.

The methods and systems for consent verification can comprise a consent verification app, which can be downloaded onto a smartphone and employed as a user interface into the consent verification system. The consent verification app is designed to be user-friendly and can be universally available through, for example, APPLE® or GOOGLE® (ANDROID®) sources.

As used herein, the phrase "at least one of A, B, and C" can be construed to mean a logical (A or B or C), using a non-exclusive logical "or;" however, it can be construed to mean (A, B, and C); in addition, it can be construed to mean (A and B) or (A and C) or (B and C). As used herein, the phrase "A, B and/or C" should be construed to mean (A, B, and C) or alternatively (A or B or C), using a non-exclusive logical "or."

The present invention has been described above with reference to various exemplary embodiments and examples, which are not intended to be limiting in describing the full scope of systems and methods of this invention. However, those skilled in the art will recognize that equivalent changes, modifications and variations of the embodiments, materials, systems, and methods may be made within the scope of the present invention with substantially similar results and are intended to be included within the scope of the present invention, as set forth in the following claims.

The invention claimed is:

1. A method for initiating and storing consent verification between a user and a person to engage in an intimate activity, the method comprising:
    preparing a consent request by the user;
    sending the consent request to the person;
    time-stamping with a first time stamp for the sending of the consent request with a first time and date;
    recording a first GPS location of the sending of the consent request; and
    receiving the consent request by the person;
    storing the consent request tagged with the first time stamp and the recorded first GPS location, in a user database and a database for the person;
    preparing a consent response by the person;
    sending the consent response to the user;
    time-stamping with a second time stamp for the sending of the consent response with a second time and date;
    recording a second GPS location of the sending of the consent response; and
    storing the consent response tagged with the second time stamp and the recorded second GPS location, in the user database and the database for the person.

2. The method according to claim 1, further comprising:
    withdrawing the consent request by the user;
    time-stamping with a third time stamp for the withdrawing of the consent request with a third time and date;
    recording a third GPS location of the withdrawing of the consent request;
    receiving the withdrawing of the consent request by the person; and
    storing the withdrawing of the consent request tagged with the third time stamp and the recorded third GPS location, in the user database and the database for the other person.

3. The method according to claim 1, further comprising sending by the user a link for installing a consent verification application on a device of the person.

4. The method according to claim 1, further comprising:
    accepting the consent request by the other person;
    agreeing to the consent request to engage in the intimate activity between the user and the other person;
    time-stamping with a fourth time stamp for the agreeing to the consent request with a fourth time and date;
    recording a fourth GPS location of the agreeing to the consent request;
    receiving confirmation of the agreeing to the consent request by the user; and
    storing the agreeing to the consent request tagged with the fourth time stamp and the recorded fourth GPS location, in the user database and the database for the other person.

5. The method according to claim 1, further comprising:
    revising terms of the consent request by the user;

adding the revised terms to the consent response; and
storing the revised terms of the consent response tagged with a fifth time stamp and a fifth recorded GPS location, in the user database and the database for the other person.

6. The method according to claim 5, further comprising:
preparing a consent answer to the revised terms of the consent response by the user;
sending the consent answer to the person;
time-stamping with a sixth time stamp for the sending the consent answer with a sixth time and date;
recording a sixth GPS location of the sending of the consent answer; and
storing the consent answer tagged with the sixth time stamp and the recorded sixth GPS location, in the user database and the database for the other person.

7. The method according to claim 5, further comprising:
accepting the consent response by the user;
agreeing to the revised terms of the consent response to engage in the intimate activity between the user and the other person;
time-stamping with a seventh time stamp for the agreeing to the revised terms of the consent response with a seventh time and date;
recording a seventh GPS location of the agreeing to the revised terms of the consent response;
receiving the agreeing to the revised terms of the consent response by the other person; and
storing the agreeing to the revised terms of the consent response tagged with the seventh time stamp and the seventh recorded GPS location, in the user database and the database for the other person.

8. A method for initiating and storing consent verification between a user and a person to engage in an intimate activity, the method comprising:
accessing a consent verification app on a device, wherein the consent verification app comprises a user profile and a consent request module configured to provide in-app consent communication between the user and the person;
entering a username, texting ID for the device, an emergency contact, an emergency code, and a 911 code into the user profile; and
storing the entered username, texting ID, emergency contact, emergency code, and 911 code in a user database;
sending a consent request from the user to the person;
tagging the consent request with a first GPS location and a first time-date stamp of when it was sent;
receiving the consent request by the person;
storing the consent request tagged with the first GPS location and the first time-date stamp, in a user database and a database for the person;
sending a reply to the consent request from the person to the user;
accepting a meeting with the user by the person;
tagging the reply with a second GPS location and a second time-date stamp of when it was sent;
receiving the reply by the user; and
storing the reply tagged with the second GPS location and the second time-date stamp, in the user database and the database for the person.

9. The method according to claim 8, further comprising:
adding a GPS location and a time-date of the meeting; and
storing the meeting tagged with the GPS location and the time-date of the meeting, in the user database and the database for the person.

10. The method according to claim 8, further comprising:
engaging in the meeting with the person;
activating the emergency code; and
sending an emergency text message and a GPS location to the emergency contact upon activation of the emergency code.

11. The method according to claim 10, further comprising:
tagging the emergency text with a third GPS location and a third time-date stamp; and
storing the emergency text tagged with the third GPS location and the third time-date stamp in the user database.

12. The method according to claim 8, further comprising:
engaging in the meeting with the person;
activating the 911 code; and
sending a distress text message with a GPS location, a name of the user and a name of the person to a 911 call center upon activation of the 911code.

13. The method according to claim 12, further comprising:
tagging the distress text with a fourth GPS location and a fourth time-date stamp; and
storing the distress text tagged with the fourth GPS location and the fourth time-date stamp in the user database.

14. A method for initiating and storing consent verification between a user and a person to engage in an intimate activity, the method comprising:
preparing a consent request by the user; sending the consent request to the person;
time-stamping with a first time stamp for the sending of the consent request with a first time and date;
recording a first GPS location of the sending of the consent request; and
receiving the consent request by the person;
storing the consent request tagged with the first time stamp and the recorded first GPS location, in a user database and a database for the person;
withdrawing the consent request by the user;
time-stamping the withdrawing of the consent request with a second time and date;
recording a second GPS location of the withdrawing of the consent request;
receiving the withdrawing of the consent request by the person; and
storing the withdrawing of the consent request tagged with the second time stamp and the recorded second GPS location, in the user database and the database for the other person.

15. The method according to claim 14, further comprising ignoring the consent request by the person.

16. The method according to claim 15, further comprising blocking the user from contacting the person.

17. The method according to claim 16, further comprising storing an identity of the user blocked by the person in a profile of the person.

18. The method according to claim 16, further comprising unblocking the user and allowing the user to contact the person.

* * * * *